United States Patent
Czechowski, III et al.

(10) Patent No.: US 8,606,846 B2
(45) Date of Patent: Dec. 10, 2013

(54) ACCELERATING PEER-TO-PEER CONTENT DISTRIBUTION

(75) Inventors: Joseph Czechowski, III, Clifton Park, NY (US); William David Smith, II, Schenectady, NY (US); Xi Wang, Niskayuna, NY (US); Christopher Duane Carothers, Schenectady, NY (US)

(73) Assignee: NBCUniversal Media, LLC, New York, NY (US)

( * ) Notice: Subject to any disclaimer, the term of this patent is extended or adjusted under 35 U.S.C. 154(b) by 612 days.

(21) Appl. No.: 11/955,463

(22) Filed: Dec. 13, 2007

(65) Prior Publication Data

US 2009/0182815 A1 Jul. 16, 2009

Related U.S. Application Data

(60) Provisional application No. 60/980,023, filed on Oct. 15, 2007.

(51) Int. Cl.
*G06F 15/16* (2006.01)

(52) U.S. Cl.
USPC .......................................... 709/203; 709/201

(58) Field of Classification Search
USPC .......................................................... 709/203
See application file for complete search history.

(56) References Cited

U.S. PATENT DOCUMENTS

| | | | |
|---|---|---|---|
| 7,069,295 B2 | 6/2006 | Sutherland et al. | |
| 7,089,301 B1 | 8/2006 | Labio et al. | |
| 7,174,385 B2 | 2/2007 | Li | |
| 7,203,741 B2 | 4/2007 | Marco et al. | |
| 7,274,658 B2 | 9/2007 | Bornstein et al. | |
| 2002/0163882 A1 | 11/2002 | Bornstein et al. | |
| 2004/0264385 A1 | 12/2004 | Hennessey et al. | |
| 2007/0028133 A1* | 2/2007 | Izutsu et al. | 714/4 |
| 2007/0064702 A1 | 3/2007 | Bates et al. | |
| 2007/0150596 A1* | 6/2007 | Miller et al. | 709/226 |
| 2007/0288593 A1* | 12/2007 | Wang | 709/217 |
| 2008/0133666 A1* | 6/2008 | Chavez et al. | 709/205 |
| 2009/0106393 A1* | 4/2009 | Parr et al. | 709/218 |
| 2009/0248872 A1* | 10/2009 | Luzzatti et al. | 709/226 |

FOREIGN PATENT DOCUMENTS

EP 1821487 8/2007

OTHER PUBLICATIONS

European Patent Office, PCT Search Report & Written Opinion, Sep. 24, 2009.
A. Qureshi, "Exploring Proximity Based Peer Selection in a BitTorrent-like Protocol," May 7, 2004, pp. 1-10.
L. Zhang et al., "Exploiting Proximity in Cooperative Download of Large Files in Peer-to-Peer Networks", Internet and Web Applications and Services, 2007 ICIW '07. ISBN:0-7695-2844-9, Second International Conference, May 13-19, 2007, Posted online Jun. 4, 2007, 6 pages.

(Continued)

*Primary Examiner* — Wing F Chan
*Assistant Examiner* — Andrew Woo
(74) *Attorney, Agent, or Firm* — Fletcher Yoder, P.C.

(57) ABSTRACT

The acceleration of peer-to-peer downloads of content files wherein a tracker performs a condition based peer selection that is dynamically adjustable. A further feature relates to the use of enhanced message scheme for communications. One embodiment is a system in a swarm having at least one origin seed capable of at least initially storing the content files with at least one tracker maintaining a list of peers wherein the tracker uses at least one dynamically adjusting peer selection algorithm to generate a condition based peer-list and provides the condition based peer-list to a requesting peer.

24 Claims, 17 Drawing Sheets

(56) References Cited

OTHER PUBLICATIONS

B.-G. Chun et al., "ChunkCast: An Anycast Service for Large Content Distribution," International Workshop on Peer-to-Peer Systems, Feb. 2006, 6 pages.

W. Acosta et al., "Unstructured Peer-to-Peer Networks—Next generation of Performance and Reliability," Dec. 15, 2006, 3 pages.

R. Susitaival et al., "Analyzing the Dynamics and Resource Usage of P2P File Sharing by a Spatio-temporal Model," ICCS 2006, Part IV, LNCS 3994, pp. 420-427.

M. Castro et al., "Exploiting network proximity in peer-to-peer overlay networks," Technical Report, MSR-TR-2002-82, 2002, pp. 1-15.

A. Legout et al., Clustering and Sharing Incentives in BitTorrent Systems, INRIA-00137444, Version 2, Mar. 28, 2007, 12 pages.

C. D. Carothers et al., "A Case Study in Modeling Large-Scale Peer-to-Peer File-Sharing Networks Using Discrete-Event Simulation," In Proceedings of the 2006 European of Modeling and Simulation Symposium which is part of the (3M) Multiconference), Barcelona, Spain, Oct. 2006, 10 pages.

R. LaFortune et al., "An Abstract Internet Topology Model for Simulating Peer-to-Peer Content Distribution," In Proceeding of the 2007 Workshop on Principles of Advanced and Distributed simulation (PADS '07), San Diego, California—Part of FCRC 2007, pp. 1-9.

BitTorrent, "What is BitTorrent?", [online] [retrieved on Dec. 7, 2007], http://www.bittorrent.org/introduction.html, 2 pages.

BitTorrent, "Bit Torrent Protocol", [online] [retrieved on Dec. 7, 2007], http://www.bittorrent.org/protocol.html, 5 pages.

BitTorrent, "DHT Protocol", [online] [retrieved on Dec. 7, 2007], http://www.bittorrent.org/Draft_DHT_protocol.html, 6 pages.

BitTorrent, "Fast Extension", [online] [retrieved on Dec. 7, 2007], http://www.bittorrent.org/fast_extensions.html, 4 pages.

BitTorrent Protocol—Wikipedia, "BitTorrent Protocol", [online] [retrieved on Dec. 7, 2007], http://en.wikipedia.org/wiki/BitTorrent_Protocol, 11 pages.

Content delivery network—Wikipedia, "Content Delivery Network or Content Distribution Networks", http://en.wikipedia.org/wiki/Content_delivery_network, 4 pages.

\* cited by examiner

400

```
┌─────────────────────────────────────────────┐
│   Receive peer-list request from a requesting peer  │
│                                             │
│                    410                      │
└─────────────────────────────────────────────┘
                       ↓
┌─────────────────────────────────────────────┐
│  Assess conditions of the swarm and the requesting peer │
│                                             │
│                    420                      │
└─────────────────────────────────────────────┘
                       ↓
┌─────────────────────────────────────────────┐
│  If there is a resource manager & swarm conditions are │
│      appropriate, use enhanced messages to provide    │
│      information about the swarm to the resource manager │
│                                             │
│                    430                      │
└─────────────────────────────────────────────┘
                       ↓
┌─────────────────────────────────────────────┐
│  If conditions of swarm & requesting peer are appropriate │
│       use enhanced messages to provide information       │
│    about requesting peer to at least one origin process  │
│                                             │
│                    440                      │
└─────────────────────────────────────────────┘
                       ↓
┌─────────────────────────────────────────────┐
│      Execute appropriate peer selection algorithm       │
│                                             │
│                    450                      │
└─────────────────────────────────────────────┘
                       ↓
┌─────────────────────────────────────────────┐
│      Send resultant peer-list to the requesting peer    │
│                                             │
│                    460                      │
└─────────────────────────────────────────────┘
```

Figure 4

ACCELERATING PEER-TO-PEER CONTENT DISTRIBUTION

RELATED APPLICATIONS

This application claims the benefit of U.S. Provisional Applications No. 60/980,023, filed Oct. 15, 2007, which is herein incorporated in its entirety by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Peer-to-Peer file-sharing technologies are being rapidly adopted to distribute digital information (e.g., multimedia such as movies, TV, music; software; and imagery). One reason for the growth of P2P usage relates to the economics of content distribution. In most cases, the content publisher benefits by lower cost distribution of data. The content consumers benefit by obtaining content faster. This is especially valid for flash crowds that occur with popular data that would otherwise overload the capacity of a publisher's web servers.

While a client-server topology may suffice for limited download access, popular web sites have traditionally resorted to using Content Distribution Network (CDN) services to provide sufficient bandwidth to handle larger crowds. There are now various commercial CDN services available (e.g., Akamai, L3, Limelight). However, with such CDN services, bandwidth and data delivery costs scale linearly with the number of users interested in downloading the site's digital information. As large downloads (e.g., TV shows and movies) become more popular, the distribution costs associated with CDN services are high. P2P technologies offer a way to dramatically reduce such distribution costs.

From a general perspective, a P2P network takes advantage of the numerous, diverse connectivity between participants in a network and the cumulative upload/download bandwidth of all network participants. A pure peer-to-peer network does not have the notion of clients or servers, but only equal peers that each simultaneously function as both "client" and "server" to the other peers in the network. This is very different from the conventional client-server approach wherein one or more servers would be coupled with a number of clients. Peer-to-peer networks are typically used for connecting peers via largely ad hoc connections and are commonly used for sharing content. Unlike the client-server approach, as the number of peers grows, the aggregate network bandwidth of the set of peers grows. Thus, each peer has the potential to obtain the composite of the content faster, there is less chance for denial of service on the part of the content source, and the content source provider's computation and network utilization remains relatively low.

In practice, there are three distinct classes of P2P based distribution technologies: live streaming, download, and hybrid. P2P live streaming technologies (e.g., PPLive) deliver live audio and/or video and must satisfy applicable quality-of-service requirements. For example, the data must arrive in linear order to support playback of content (note that buffering allows some slop in arrival order) while maintaining sufficient bit rate in order to sustain playback. Furthermore, because the content is live, peers do not typically store significant amounts of content other than what is buffered locally. With asymmetric broadband technologies that offer faster download rates compared to upload rates, the ability to leverage peers in distributing video is diminished when the effective upload bandwidth on the peer's Internet connection is less than or comparable to the video content's encoding bit-rate. Hence, higher bit rate content requires additional content servers to supplement the bandwidth provided by the peers, which in turn drives up distribution costs. Because of bit-rate limitations, live streaming technologies are typically used with lower bit-rate media such as live audio and low bit-rate video streams.

With P2P download technologies, such as the original BitTorrent protocol, the digital information is delivered on a "best effort" basis with data being delivered to each peer in no particular order. Hence, traditional P2P download technologies are typically not suitable for video streaming applications, but offer lower distribution costs. Many companies are now offering P2P download-based services with BitTorrent-based protocols being among the most commonly used mechanisms.

Hybrid P2P technologies (also referred to as "peer assisted") enable streaming while simultaneously allowing content to be stored locally on peers. Thus compared to P2P live streaming, a larger pool of peers is available to supply video content to fellow peers. Because video is stored locally, premium content usually must have some form of content protection mechanism (e.g., encrypted file systems, DRM technologies, etc.). There are now many companies offering such hybrid P2P technologies, including VeriSign, Inc., Akamai Technologies, Pando, iTiva, and BitTorrent, Inc. Hybrid P2P technologies typically offer improved quality of service. Most of these efforts have focused on combining P2P-based networks with Content Delivery Network (CDN) services that supplement the P2P network bandwidth in order to ensure higher quality-of-service to individual peers. Some of these (e.g., iTiva) also leverage web proxy servers provided by ISPs to supplement the CDN and P2P networks. The objectives of these hybrid technologies are typically to enhance the quality-of-service for peers, such as enabling streaming video delivery, while reducing distribution costs for content providers and ISPs. However, the use of web and CDN services to supplement P2P bandwidth adds distribution costs over pure P2P-based services. Hence the use of CDN services should typically be minimized without sacrificing end user quality of service.

While content providers and the content consumers enjoy the benefits of P2P, the consumers' Internet service providers (ISPs) do not appreciate the massive data exchange across the peering overlay network and the grossly inefficient use of network resources and bandwidth. Specifically, popular P2P technologies (e.g., BitTorrent) tend to ignore peer locality considerations when matching peers with each other. Hence, peer-to-peer communications are likely to leave the local ISP's network through key network resources that connect to other ISPs. Many commercial peer-to-peer technologies are now integrating various heuristics to group peers that are "nearby", such as within the ISP's local network. Hence, use of "peer locality" to match peers helps make P2P technologies more appealing to ISPs by reducing network congestion with added benefit of enhancing P2P performance for peers.

Peer-to-peer (P2P) technologies provide significantly lower cost mechanisms for content providers seeking to distribute digital information to many different interested parties. However, the analysis of P2P performance and scaling characteristics show that existing peer selection methods can lead to sub-optimal content distribution performance.

BitTorrent Terminology

Some general terminology descriptions may be helpful and are included herein for convenience:

BitTorrent client—a computer program that implements a peer that uses the BitTorrent protocol. The client software may be installed on a variety of devices, such as personal computers, set top boxes, and portable device such as cell phones or media players.

BitTorrent protocol—a P2P protocol used for distributing content via a swarm.

Content Distribution Network or Content Delivery Network (CDN)—a system of Internet-interconnected computers that cooperate transparently to deliver content directly to interested end users.

current peer—the peer currently under consideration.

distributed hash table (DHT)—a decentralized, network-based system that provides a lookup service similar to a hash table.

flash crowd—a sudden network traffic surge caused by a significant influx of users attempting to access the same content.

Mainline—an open source BitTorrent client developed by BitTorrent, Inc. that serves as the reference implementation of the BitTorrent protocol.

miscreant peer—any peer that by design (as opposed to circumstances) does not comply with the implied sharing nature of the swarm.

non-seed—any peer that does not have all the content.

non-origin peer—any peer that is not an origin peer.

non-origin seed—any seed that is not an origin seed.

origin peer—any peer that is controlled by the content publisher and/or CDN and whose primary function is facilitating the distribution of content.

origin seed—any seed that is controlled by the content publisher and/or CDN and can be brought on-line or removed based on demand, and is typically used to initiate distribution of content.

origin server—the original content source computer network service from which the content distribution infrastructure obtains content to disseminate, typically operated by CDN services or content publisher.

overlay network—a logical network that is built on top of another (physical or lower-level logical) network, wherein this typically refers to the communication topology among peers.

peer—any piece-sharing participant in a swarm.

peer-list—a list of peer identifiers, usually Internet protocol addresses and ports.

peer selection algorithm—method used to select a subset of peers in the swarm.

piece—a portion of the content being shared by a swarm.

proxy server—a computer network service that allows clients to make indirect network connections to other network services used to control references locally (ISP, business, etc.). Proxy servers typically cache content locally and are thus leveraged to alleviate traffic on key network resources.

remote peer—a peer on the peer-list of the current peer.

seed—any peer that has all the content.

server—a computer network service.

swarm—a group of P2P processes that interact with each other via a particular file distribution protocol for the purpose of sharing specific content The group is largely composed of peers, but also includes "servers" such as the tracker, web server(s), and proxy server(s).

torrent—the content (unique file or set of files) to be distributed within a swarm—plus a torrent file.

torrent file—a small file containing meta information about a torrent. The file contains unique identifiers (block hashes) for the content and its pieces, as well as the URL(s) for the associated tracker(s).

tracker—a network-based service that helps peers in a swarm find each other, wherein the tracker functionality can be centralized or distributed.

distributed swarm—a swarm that does not require the use of a centralized tracker (trackerless) and the tracker functionality is implemented by peers.

BitTorrent Overview

BitTorrent has been one of the most popular protocols for file-sharing and will be used herein for illustrative purposes as an example of the P2P system. It should be noted that the BitTorrent descriptions are based on the present state of the published materials of the BitTorrent protocol and subject to change.

BitTorrent is a protocol that allows a content provider to distribute content to a swarm of peers. The peers within the swarm will then disseminate parts of the content to each other in a peer exchange fashion such that as one peer is obtaining new pieces of content, it is simultaneously sharing its other pieces of content with other peers. One of the features that makes BitTorrent unique is that it provides a built-in mechanism to help facilitate the fair distribution of content and to help prevent selfishness on the part of peers by using a game theoretical "tit-for-tat" piece distribution algorithm. However, there are ways to manipulate this equal distribution scheme and variants (e.g., miscreant peers) have evolved that create priority ranking as well as disrupting equitable sharing which is sometimes referred to as "free riding."

The functionality of a BitTorrent system is well publicized and known to those skilled in the art. However for completeness, a simplified high-level process flowchart for a BitTorrent system is shown in FIG. 1. Initially, there is some content file from a content provider that is prepared for sharing 105. For example, the content provider can be a large corporation or enterprise that uploads the data file to a company server for preparation (e.g., transcoding, DRM, watermarking, etc.), or it could be an independent music artist that prepares a new music video for dissemination to its fans.

The content file is packaged in a format that adheres to the respective P2P protocol being used for the dissemination 110. For example, a large content file will typically be distributed as pieces. Packaging in BitTorrent typically entails generating cryptographic hash values for each of these pieces to ensure their integrity, as well as generating a cryptographic hash of the entire content set. For example, one hash version is the US Secure Hash Algorithm 1 (SHA-1). These hashes are placed in a metafile (i.e., the .torrent file in BitTorrent) describing the information about the content to be distributed via P2P. The content data itself can be any form of digitized data and may consist of one or more files, folders, etc. In one example, the content file is a video and is packaged according to the BitTorrent protocol.

Once the content file has been packaged according to the appropriate P2P requirements, the content is registered with some form of tracker and a copy is placed on some origin seed 115. The metafile with the information about the content is published 120, such as by placing the .torrent file on a website or a syndication feed (e.g., an RSS feed). After the P2P file has been published 120, the content file is then available for downloading.

Peers will join the swarm 125 by downloading the metafile and registering with the tracker to initiate the transfer process.

Upon request, the tracker will supply a peer with a list of other peers 130. The tracker will use its peer selection algorithm to determine which peers should go on any given peer-list. When a peer receives a peer-list from the tracker, it attempts to connect to the peers specified on that list 135. Peers then exchange pieces of content with their connected peers 140. At some point (typically determined by the end user), the peer will leave the swarm 145. If the peer leaves the swarm after having obtained all the content (typical), it is said to have been successful.

Referring to FIG. 2, a block diagrammatic presentation of a BitTorrent P2P system 210 is depicted for delivering content 220. The intent of the system is for all the peers in the overlay network of peers 270 to each ultimately obtain a full copy of the content. For convenience, only a few elements are shown, however there can be anywhere from one to hundreds of thousands of participants in a P2P swarm. The BitTorrent protocol in this example uses several components, namely torrent files 230, web servers 240, tracker servers 250, origin seed peers 290, and non-origin peers 280. It should be understood that the P2P technology is highly dynamic and that the details herein are intended to provide an understanding of the BitTorrent system at some particular time and may not reflect the most recent protocol version, and some of the command instructions and particulars may differ.

The original content owner/distributor with some content 220 to be distributed will use a complete copy of the content file(s) to generate a torrent file 230. A torrent file 230 is typically composed of a header plus a number of cryptographic hashes for the pieces of the original content file(s), where each piece of the file is a portion (e.g.: 256 KB) of the whole file. The header information typically denotes the IP address or URL of the tracker 250 for the torrent file 230, as the BitTorrent client must be registered with the tracker 250. Once created, the torrent file 230 is then published on a publicly accessible web server 240 or made available in other forms such as a Really Simple Syndication (RSS) feed.

An origin server or web server 240 is typically the initial distribution content point wherein the content provider will post the availability of some content such as a movie trailer onto a web server 240 for dissemination to the public or to some restricted users. The content itself is not on the web server, only the information about the content. Content providers may own their own servers, or they can use third party web servers. While a web server 240 is used in this example, there are many embodiments that operate with other distribution mechanisms such as via an RSS feed.

The torrent's unique id (the cryptographic has defined in the torrent file 230) is registered with the tracker 250, and the origin seed peer(s) 290 are established with a full copy of all the content pieces comprising the content 220 and the torrent file 230. The origin seed peer(s) 290 start with all the content and will seed the other non-seed peers in the overlay network of peers 270. A new peer needs to register itself with the tracker 250 in order to join the network of peers 270. It does this by contacting the Web Server 240 to obtain the torrent file 230 that specifies the address of the tracker 250. The new peer then contacts the tracker 250 to request the addresses of other peers within the overlay network of peers 270. The tracker 250 then uses peer selection software 260 to randomly choose a subset of peers that it knows about; creates a list of addresses of these selected peers; and sends the resultant list of peer addresses (which will subsequently be referred to as a peer-list) to the requester. Because of the size limit (typically 50 peers) of the peer-list provided by the tracker and mainline BitTorrent's random peer selection, the probability of creating an isolated clique in the overlay network of peers 270 is relatively low, which typically ensures robust network routes for piece distribution.

There are two ways that a current peer can establish a connection with another peer. The first way is when the current peer contacts a remote peer as a result of receiving the remote peer's address from the tracker. The second way is when another peer contacts the current peer. There is an upper limit on the number of remote connections that a current peer can establish. The upper limit is a configuration parameter that according to the BitTorrent reference implementation defaults to eighty. At any point during the piece exchange process, peers may join or leave the swarm's peering network 270. Because of the highly volatile nature of these swarms, a peer will re-request an updated list of peers from the tracker 240 periodically (typically between five and thirty minutes—based on default parameters from the BitTorrent reference implementation). This ensures the robustness of the swarm assuming the tracker 240 remains operational.

The tracker 250 is a network-based server and centrally coordinates the P2P transfer of files among the users. BitTorrent trackers are software server toolkit applications, and XBT, BNBT and CBTT are open source examples of BitTorrent tracker toolkits. Any non-origin peer 280 connects to the tracker 250 and requests a peer-list. The tracker 250 responds by providing the peer 280 with a peer-list that it can use to obtain pieces of the content file from the other peers in the overlay network of peers 270. Typical trackers, such as XBT, create the peer-list by randomly selecting peers that the tracker believes are currently in the swarm—but excluding the requesting peer. If the tracker 250 fails or is taken offline, peers 280 will be unable to connect to additional peers and thereby may be unable to continue sharing those P2P files.

The tracker 250 maintains information about the BitTorrent peers that it has registered. In particular, the tracker identifies each peer that is participating in the network of peers 270. It also typically tracks information that it receives each time it is contacted by a peer such as the number of bytes of content that it has uploaded, the number of bytes of content that it has downloaded, and the number of bytes of content that it still lacks.

The origin seeds 290 and other peers 280 typically transfer pieces (e.g., 256 KB portions) of the content file among themselves using a complex, non-cooperative, tit-for-tat algorithm. After a piece is downloaded, the current peer will validate that piece against the cryptographic hash for that piece. As noted, the hash for that piece is contained in the torrent file 230. When a piece is validated, the current peer is subsequently able to share it with other peers in its peer set (which is a subset of the entire network of peers 270) who have not yet obtained it. The determination of which piece to request from another peer is done using a rarest piece first policy which is used exclusively after the first few randomly selected pieces have been obtained by a peer (typically three pieces but this is a configuration parameter). Because each peer announces to all peers in its peer-set each new piece it has obtained (via a HAVE message), all peers 280 are able to keep copy counts on each piece and determine within their peer-set which piece or pieces are rarest (i.e., lowest copy count). When a non-seed peer has obtained all pieces for the file, it can then switch to being a seed for the content 220.

A present version of the BitTorrent system uses a distributed hash table (DHT) based tracker mechanism. This approach increases swarm robustness even with tracker failures or otherwise without a tracker.

Message Protocol The BitTorrent protocol and behavior are well publicized and known to those skilled in the art.

Certain elements and behaviors associated with the BitTorrent protocol are highlighted herein for convenience. When describing specific parameters associated with the BitTorrent protocol, default values associated with the mainline BitTorrent implementation are used. Note that these values may be modified in different BitTorrent implementations.

The mainline BitTorrent message protocol includes 11 primary messages (excluding any custom or "Fast Extensions"). All intra-peer messages are typically sent using TCP whereas peer-tracker messages are typically sent using HTTP, TCP or sometimes UDP. While the commands may vary depending upon the version of the BitTorrent software being utilized, several basic functions are explained herein for exemplary purposes.

Upon entering a swarm, each peer is in the choked and not interested states. Once a peer has obtained its initial peer-set (up to fifty peers by default) from the tracker, it will initiate a HANDSHAKE message to forty peers by default. The upper bound on the number of peer connections is eighty. Thus, each peer keeps a number of connection slots available for peers who are not in its immediate peer-set. This reduces the probability that a clique will be created. The connections are maintained by periodically sending KEEP ALIVE messages.

Once two-way handshaking between peers is complete, each peer will send the other a BITFIELD message that contains an encoding of the pieces that that peer has. If a peer has no pieces, no BITFIELD message is sent. Upon receiving a BITFIELD message, a peer will determine if the remote peer has pieces it needs. If so, it will schedule an INTERESTED message. The remote peer will process the INTERESTED message by invoking its choker algorithm. The output from the remote peer's choker (upload side) is an UNCHOKE or CHOKE message. The response to an INTERESTED message is typically nothing or an UNCHOKE message. Once the peer receives an UNCHOKE message, the piece picker algorithm is invoked on the download side of the peer and a REQUEST message will be generated for a chunk, that is, a 16 KB (16,000 bytes) chunk within a piece. The remote peer will respond with a PIECE message that contains the 16 KB chunk of data. This response will in turn result in additional REQUESTS being sent.

When all 16 KB chunks within a piece have been obtained, the current peer will send a HAVE message to all peers to which it is connected. Upon receipt of the HAVE message, a remote peer may decide to schedule an INTERESTED message for that peer which results in an UNCHOKE message and then REQUEST and PIECE messages being exchanged. Thus, the protocol ensures continued downloading of data among all connected peers. Now, should a current peer have completely downloaded all content available from a particular remote peer, it will send a NOT INTERESTED message to that remote peer. Upon receipt of the NOT INTERESTED message, the remote peer will schedule a CHOKE message if the peer was currently in the unchoke state. Likewise, the remote peer will periodically "choke" and "unchoke" interested peers via the choker algorithm. Last, when a peer has made a request for all pieces of content, it will enter "endgame" mode. Here, requests to multiple connected peers for the same piece can occur. Thus, a peer will send a CANCEL message for that piece to those other peers when one remote peer has responded with the requested 16 KB chunk.

Choker Algorithm

There are two distinct choker algorithms, each with very different goals. The first is the choker algorithm used by a seed peer. Here, the goal is not to select the peer whose upload data transfer rate is best but instead maximize the distribution of pieces. In the case of non-seed peer, it uses a sorted list of interested, connected peers based on upload rates as one of the key determining factors. That is, it wants to try to find the set of peers with whom it can best exchange data.

The seed choker algorithm (SCA) generally only considers peers that have expressed interest in the current peer. First, the SCA orders all of its unchoked peers according to the time they were last unchoked with most recently unchoked peers listed first within a twenty second window. All other connected peers outside that window are ordered by their upload rate. In both cases, the fastest upload rate is used to break ties between peers. Now, during two of the three rounds, the algorithm leaves the first three peers unchoked and unchokes another randomly selected peer. This is known as the optimistic unchoked peer. During the third round, the first four peers are left unchoked and the remaining peers are sent CHOKE messages if they are currently in the unchoked state.

Both choker algorithms are scheduled to run every ten seconds and can be invoked in response to INTERESTED/NOT INTERESTED messages. Each invocation of the choker algorithm counts as a round. There are three distinct rounds that both choker algorithms cycle through.

For the non-seed choker algorithm, at the start of round one, (i.e., every thirty seconds, by default), the algorithm chooses one peer at random that is choked and interested. As in SCA, this is the optimistic unchoked peer (OUP). Next, the non-seed choker algorithm orders all peers that are interested and have sent at least one data block to the current peer in the last thirty second time interval, otherwise that remote peer is consider to be "snubbed". Snubbed peers are excluded from being unchoked to prevent free riders and ensure that peers share data in a relatively fair manner. From that ordered list, the three fastest peers are unchoked. If the OUP is one of the three fastest, a new OUP is determined. The OUP is only unchoked on every third round.

Piece Picker

The piece picker is a two-phase algorithm. The first phase is "random". When a non-seed peer has no content, it selects three pieces at random to download from peers that "have" those particular pieces. Once a peer has those three pieces, it shifts to a second phase of the algorithm which is based on a "rarest piece first" policy. Here, each piece's count is incremented based on HAVE and BITFIELD messages. For each remote peer that has unchoked the current peer, the piece with the lowest count (but not zero) that the remote peer has is selected as the next piece to be requested from the remote peer.

There is considerable anecdotal evidence that BitTorrent-based P2P technologies can suffer from quality-of-service issues. For commercial applications that offer premium content, such quality-of-service issues would be undesirable.

Thus, there are P2P download problems that have not been resolved by the state of the art technology. What is needed, therefore, are systems and techniques for improving the performance, scaling, and quality of service provided by P2P technologies while reducing the dependence on more expensive content distribution options.

SUMMARY OF THE INVENTION

One embodiment is a system for acceleration of peer-to-peer download of content files in a swarm, the system including at least one origin seed at least initially or temporarily part of the system and storing the content files. While the peers initially may obtain pieces of the content from origin seeds, the peers typically obtain content by sharing portions of the content among themselves. There is at least one tracker maintaining a list of peers in the swarm, and at least one requesting peer participating in the swarm in order to obtain the content file. Typically there will be a plurality of tracker registered peers in the swarm, wherein the peers learn about each other's existence from the tracker. The tracker generates a condition based peer-list and provides the condition based peer-list to the requesting peer.

A further aspect relates to the tracker communication with the origin seed using an enhanced message scheme. In order to facilitate the enhanced messages, the tracker and the origin seed would incorporate the enhanced protocol capability. For example, the tracker can use the enhanced messages to supply information about the requesting peer to the origin seed.

The tracker according to one example can be a centralized tracker server. In one example, the requesting peer is actually the origin seed and it obtains a condition based peer list.

According to one aspect, the origin seed can be removed from the system. This could be done, for example, once one or more peers in the swarm have obtained a full copy of the content files or if the swarm as a whole has a full copy of the content. This allows the origin seed to be used for other content files and other swarms for better resource management.

The swarm can be a plurality of peers that exchange portions of content from seeds and other peers. Peers typically locate other peers by requesting peer lists from the tracker. In accordance with one aspect, the tracker provides a requesting peer with a condition based peer-list based on a swarm condition and/or a requesting peer condition. The swarm condition includes a number of variables including number of non-seeds in the swarm, number of non-origin seeds in the swarm, number of origin seeds in the swarm, rate of change of number of non-seeds in the swarm, rate of change of number of non-origin seeds in the swarm, rate of change of number of origin seeds in the swarm, and combinations thereof. The requesting peer condition can also have a number of variables including the type of the peer requesting the peer-list, age of the peer, amount of content lacking by the peer, amount of content received by the peer, amount of content transmitted by the peer, network locality of the peer, geographic locality of the peer, percent of content lacking by the peer, total number of times the peer has requested the peer-list, the elapsed time since last request by the peer for the peer-list, upload rate of the peer, download rate of the peer, and combinations thereof.

In a further aspect, the system includes client information storage that can be used to maintain such features as peer IP addresses, ports, geographic location, and network topology for the peers.

An additional aspect is the inclusion of an origin scout that is used to obtain information about the swarm and/or the peers and provide this information to the tracker.

A further feature of the present system is that the condition based peer-list is operational with legacy systems.

One embodiment is a method for producing a selective peer-list for swarms including processing a peer-list for a plurality of peers in the swarm, receiving a peer-list request from a requesting peer, determining a condition of the swarm and/or a condition of a requesting peer, processing the selective peer-list based on one or more of the conditions, and communicating the selective peer-list to the requesting peer.

An additional feature includes communicating peer information about the requesting peer to an origin peer using enhanced messages. The method in one aspect includes using the enhanced messages for controlling peer functions, wherein the peer functions include sizing of peer upload bandwidth, sizing of peer tracker re-request interval, limiting connection time, refusing connections from other peers, cycling through content during upload, and combinations thereof.

The processing of the selective peer-list according to one embodiment is based on at least one of swarm conditions and requesting peer conditions. The processing of the selective peer-list includes at least biasing the peer selection toward younger peers, biasing the peer selection toward older peers, omitting at least some origin seeds from the peer-list generated for a peer, omitting at least some seeds from the peer-list generated for a seed, biasing the peer selection for the peer-list based on network locality, biasing the peer selection for the peer-list based on geographic locality, generating an artificial non-empty peer-list for any non-origin seed when a ratio of seeds to peers in the swarm exceeds a programmable threshold, and combinations thereof.

The enhanced message communications and the peer selection algorithms can be software modules that can be stored on a computer readable medium such that computer executable instructions perform the processing detailed herein. The selection of the peer selection algorithm in one aspect is dynamically changeable. Furthermore, the parameters associated with the peer selection are also adjustable.

Another aspect includes processing of the selective peer-list using a geographical network topology and reducing a network path length for at least some of the peers. Another aspect includes processing of the selective peer-list using a geographical topology and reducing a geographical path length for at least some of the peers. Another aspect includes processing of the selective peer-list using a network topology and increasing expected network bandwidth of the path for at least some of the peers.

A further feature is that dynamically adjusting the selective peer-list includes setting a plurality of programmable protocol parameters and/or selecting a peer selection algorithm. Both of these features can affect the swarm performance.

The processing can include encrypting of content files, encrypting peer communications, and authenticating a client.

In the distributed tracker peer example, the tracker functionality is performed by a peer, wherein the peer would have the software to allow for the enhanced messages and could also have the algorithms for performing the peer selection. In a further example, these functions can be split among two or more of the peers.

One embodiment is an enhanced peer-to-peer system for acceleration of downloads for content files in a swarm, including at least one initial origin seed storing content files and a plurality of non-origin peers, wherein the origin seed and the non-origin peers form a peer network. At least one tracker means is used for generating and distributing a selective peer-list to the origin seed and/or the non-origin peers, wherein the tracker means processes the selective peer-list based upon a condition of the non-origin peers and/or a condition of the swarm.

One technical effect of the systems and techniques herein relate to improving the P2P performance. The disclosed systems and techniques address scaling issues associated with P2P technologies in order to enhance quality-of-service while reducing the need to supplement the P2P network with CDN and/or web proxy servers.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4 is a flowchart showing the peer selection processing of a P2P system according to one embodiment.

DETAILED DESCRIPTION

Figure 1:
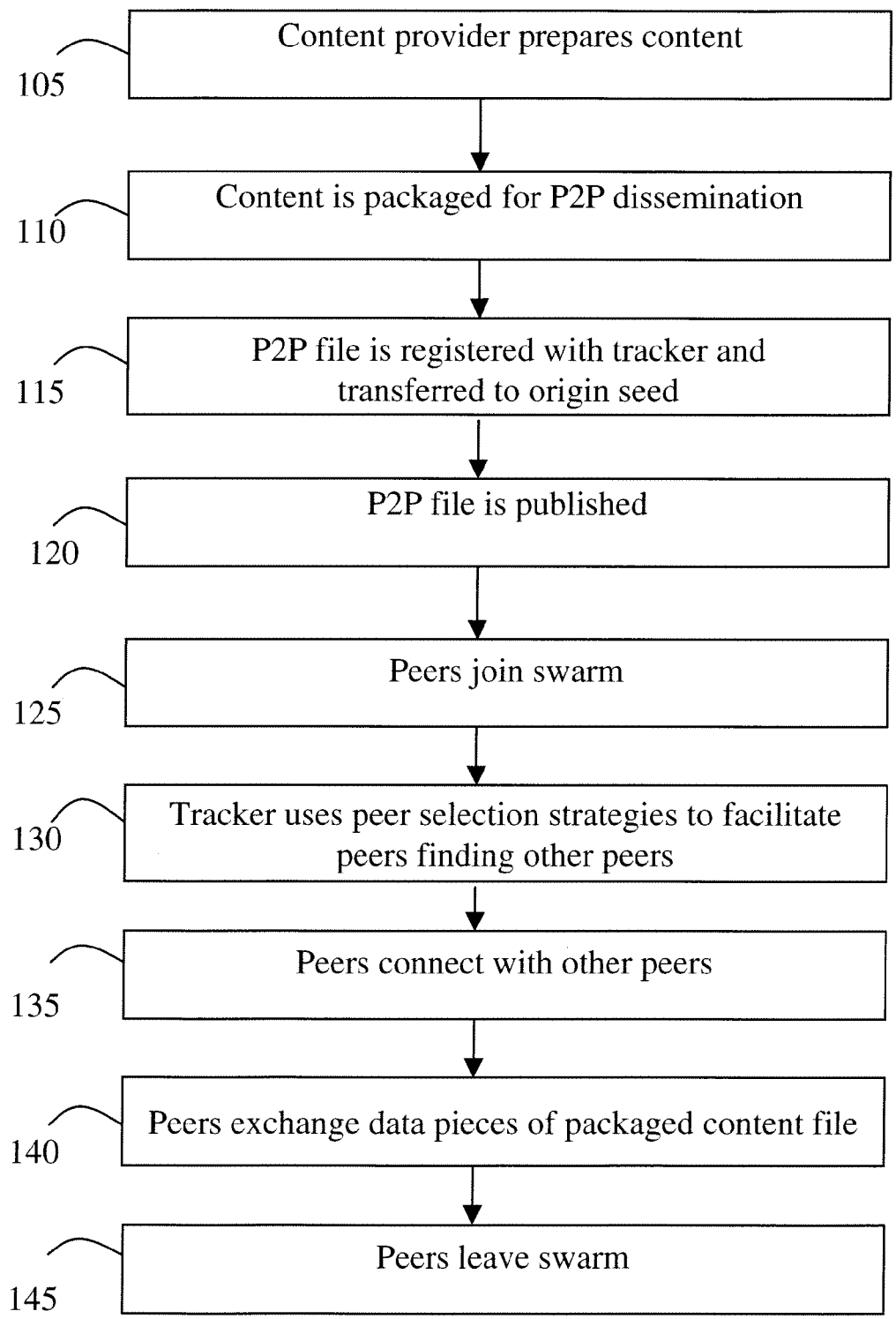
FIG. 1 is a prior art flowchart showing the processing of a P2P system.

A general embodiment improves the relationship among peers to accelerate content distribution performance. Furthermore, the performance advantages are shown to scale from a few hundred to hundreds of thousands of concurrent users, and may scale indefinitely as the number of users grows. While there have been other attempts to improve the P2P performance, many of these attempts looked at relatively small swarms of less than one thousand peers. There is no comprehensive way to examine an actual swarm "in the wild" and only superficial examination was possible. Further, while it would be possible to comprehensively examine a small fully controlled swarm, it would be very difficult to comprehensively examine a large fully controlled swarm.

However, the swarm complexity is not appreciated until significantly larger swarm sizes are studied and carefully analyzed, especially with respect to large-scale P2P-based content distribution. A comprehensive examination of large-scale swarms is possible in a simulated environment. Certain realizations were the result of extensive research on BitTorrent performance and scaling with a focus on the optimization of BitTorrent performance during large swarms. The systems and techniques detailed herein looked at simulations of the P2P interactions in swarms of a variety of sizes including large swarms (e.g., over 250,000 simultaneous peers). Incorporated by reference for all purposes are two papers, namely "An Abstract Internet Topology Model for Simulating Peer-to-Peer Content Distribution" by LaFortune et al, in Proceedings of the 2007 Workshop on Principles of Advanced and Distributed Simulation (PADS '07), San Diego, Calif.; and "A Case Study in Modeling Large-Scale Peer-to-Peer File-Sharing Networks Using Discrete-Event Simulation" by Carothers et al, in Proceedings of the 2006 European Modeling and Simulation Symposium, Barcelona, Spain, October 2006.

By way of example, as the number of simultaneous users participating in a swarm rapidly increases, the useable bandwidth does not increase linearly with the swarm size, resulting in longer download times experienced on the part of peers. The systems and methods detailed herein represent a significant advance in the understanding and capabilities for P2P content distribution performance and scaling, and solve such performance and scaling issues with peer-to-peer content distribution.

The present system and techniques introduce several enhancements to the underlying P2P technologies. BitTorrent is used herein for illustrative purposes as an example to demonstrate the effectiveness of the methods and systems detailed herein for an enhanced peer selection P2P system. However the system and methodologies detailed herein are not limited to the BitTorrent protocol and can be implemented into other P2P schemes as well as the many BitTorrent variations that have evolved. For convenience, several definitions are provided as follows:

enhanced messages—one or more specific messages that are not in the current P2P protocols that are herein referred to as PUSHED_PEER_LIST, CONFIGURE_PEER, SCOUT_REPORT, CONFIGURE_TRACKER, and TRACKER_REPORT. One embodiment restricts the usage of these messages to communications among origin processes. A further embodiment implements these messages as extensions to an existing P2P protocol. Another embodiment implements them in a separate protocol.

enhanced origin seed—any special peer that behaves like an origin seed toward other peers in the swarm, but also has capabilities unlike an origin seed such as working with enhanced origin processes such as the enhanced Tracker using messages that complement the P2P protocol in an effort to better manage the swarm.

enhanced tracker—a network-based process that helps peers in a swarm to find each other with enhanced (beyond the BitTorrent protocol) capabilities for interacting with the enhanced origin processes, such as origin seeds, to improve swarm performance.

enhanced peer selection software—software that implements a collection of peer selection algorithms and an algorithm for selecting the appropriate peer selection algorithm to use based on a variety of parameters.

origin process—a process in the P2P system other than a non-origin peer.

origin scout—a peer that is controlled by the distribution services, such as content publisher and/or CDN, and whose primary purpose is to gather intelligence about other peers and provide that information to other origin processes (e.g., the tracker).

P2P client—a non-origin peer. It should be noted that the term "P2P client" will be used when the intention is to emphasize the fact that origin seeds are servers relative to non-origin peers—without changing the fact that non-origin peers will typically be both clients and servers relative to other non-origin peers.

resource manager—network-based service that coordinates the associated resources (e.g., trackers, origin seeds, etc.) of a content provider or content distributor to effectively support a collection of swarms.

start set—an enhanced tracker-based grouping of peers that are known to the enhanced tracker and that the enhanced tracker does not believe to be seeds.

The tracker is responsible for distributing peer-lists to peers, and the "standard" BitTorrent tracker typically generates the peer-lists randomly. By observation of the results of simulated swarms, swarm performance is impacted by modifying the peer selection technique used by the tracker.

A BitTorrent simulator allowed observations of BitTorrent swarm dynamics, and particularly the dynamics of large swarms. For example, it was noted that the origin seed(s) need not use standard P2P client code and can incorporate custom code while maintaining interoperability with non-origin peers in a swarm. It was also noted that swarm performance was improved by having additional communication messages that are used only for communications among origin processes such as the enhanced tracker and the enhanced origin seed(s). Further, various peer selection algorithms can be used to optimize the download scenarios.

Figure 3:
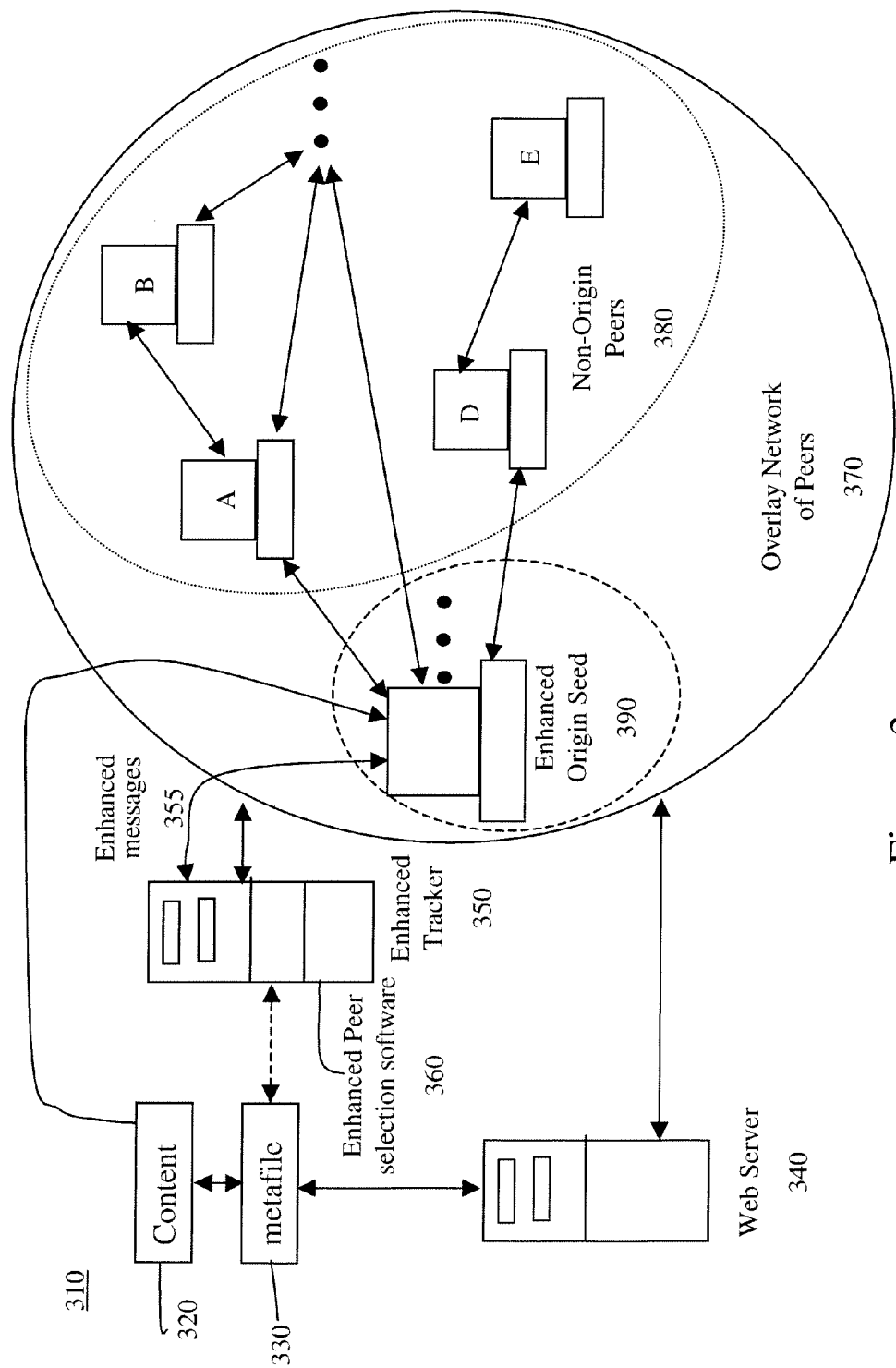
FIG. 3 is a diagrammatic illustration of an enhanced P2P system with improved peer selection configured in accordance with one embodiment of the present invention.

FIG. 3 shows one embodiment of the enhanced peer selection P2P system 310 for improving performance. According to this embodiment, the system includes an enhanced tracker 350 with enhanced peer selection software 360 and one or more enhanced origin seeds 390. By utilizing the enhanced peer selection software 390 to generate an enhanced peer-list, and utilizing enhanced messages 355 between the enhanced tracker 350 and the enhanced origin seed(s) 390, the present system is able to positively impact the swarms content distribution rate as well as reduce the standard deviation on download times of peers, resulting in significantly better quality of service for users participating in certain types of swarms.

The software components that permit the enhanced message scheme to be communicated among the origin processes can be an upgrade or addition to existing software for easy implementation into existing trackers/origin seeds and can also be designed into new trackers/origin seeds. Since the enhanced tracker 350 does not necessitate a change to the BitTorrent protocol, it is compatible with BitTorrent protocol compliant P2P clients. As previously indicated the system and techniques are not limited to the BitTorrent protocol and can be implemented into the software supporting the tracker functionality and origin seed functionality.

It should be noted that the reference to the term enhanced tracker refers to the tracker subsystem with functionality that can be deployed via a centralized tracker server or a distributed tracker also referred to as "trackerless" system with at least one distributed tracker peer performing the tracker functions. The enhanced tracker subsystem includes at least two unique features, including performing condition based peer selection and utilizing enhanced messages.

The prevailing view is that "small world" (i.e., random) peer selection is a preferred embodiment. That is, peer selection is done independent of the condition of peer requesting the peer-list and independent of the condition of the swarm when the request is made. The enhanced peer selection process acknowledges both that all peers are not equal and that all swarms are not equal. It uses a collection of peer selection algorithms tailored to the circumstances in which the request was made. In particular, origin seeds, non-origin seeds and non-seeds are quite distinct and are treated as such by the enhanced peer selection software. Similarly, a steady-state swarm is quite different from one experiencing a flash crowd. One embodiment of the present system is used for flash crowds that tend to stress the present state of the art P2P distribution schemes.

Figure 2:
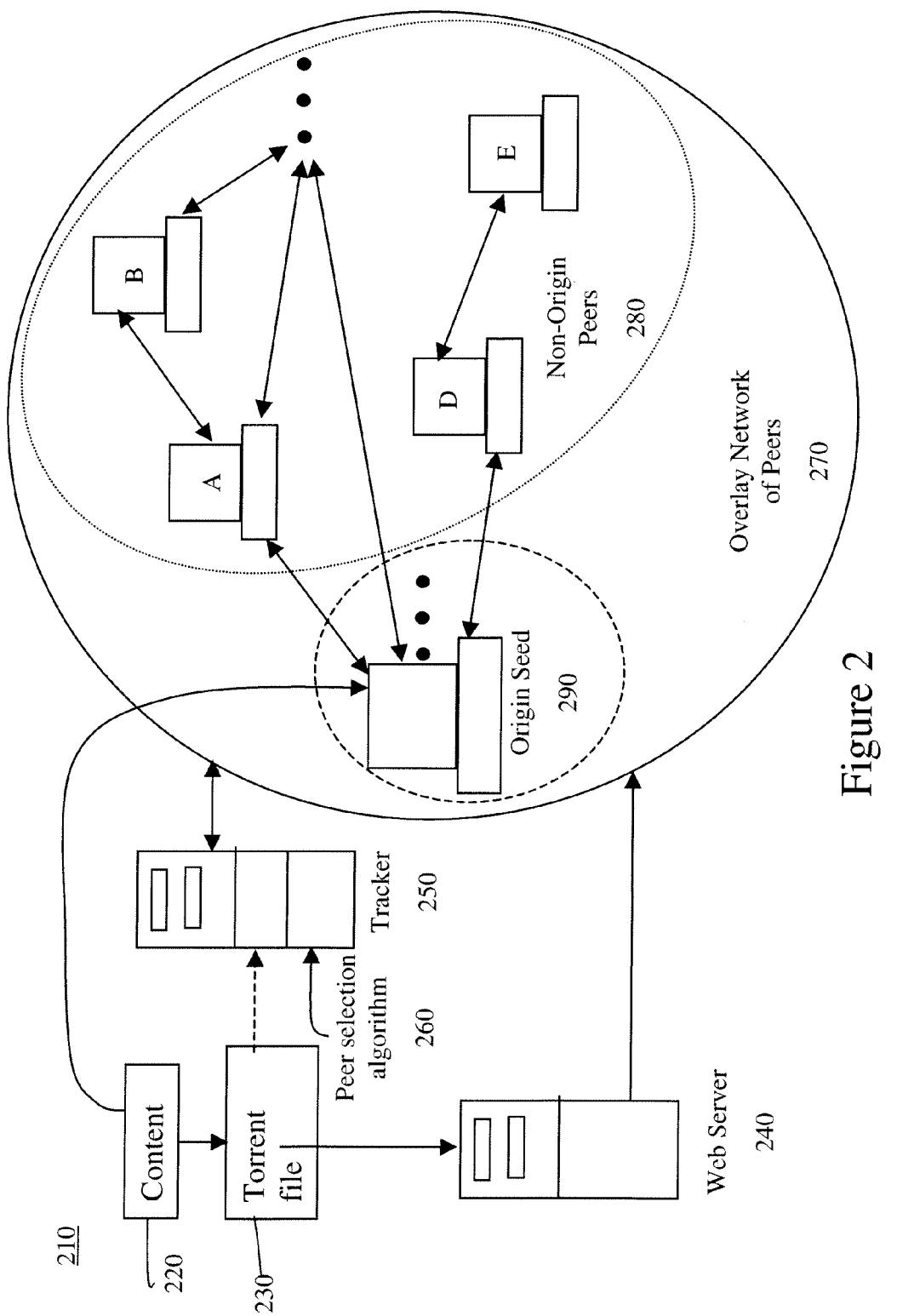
FIG. 2 is a prior art diagrammatic illustration of a P2P system showing the various elements.

From the end-user perspective, the operation of the enhanced peer selection P2P system 310 appears functionally equivalent (as compared to the operation of an non-enhanced system such as shown in FIG. 2) with the exception that the overall quality of service is improved. This quality of service improvement is due to the improved peer network operations resulting from the enhanced peer selection software used by the enhanced tracker. One aspect implements the software so that it conforms to the P2P protocol when interacting with the P2P clients, and it simultaneously allows the enhanced tracker's peer selection process to explicitly distinguish among the peer conditions and/or swarm conditions. This approach allows the system to be P2P client agnostic and makes changes (or even their existence) functionally invisible to the client code, to the end-users, and to any miscreant peers. This also allows the enhanced tracker 350 and enhanced origin seed peers 390 to co-exist with non-enhanced units and to function in the normal fashion when appropriate.

Referring again to FIG. 3, the content 320 is processed in a similar fashion as in FIG. 1 and formatted to the P2P protocol including the generation of some metafile 330 with the content information. For the BitTorrent example, a torrent file is generated and communicated to the enhanced tracker 350. The content metafile 330 is also typically communicated to a web server 340 or RSS feed. The enhanced tracker 350 includes the enhanced peer selection software 360 that is used to select the most appropriate peer selection algorithm. The peer selection processing is dynamically adjusting according to the conditions of the swarm and/or the requesting peer. There are also programmable parameters associated with the P2P protocol that can be manipulated for certain conditions and operating performance.

There are one or more enhanced origin seeds 390 that communicate with the enhanced tracker 350 as well as the non-origin seed peers 380. The non-origin peers 380 are the various P2P clients participating in the swarm of peers (along with any enhanced origin seeds 390) and providing limited status/identification information to the enhanced tracker 350. It should be noted that the enhanced tracker 350 is adaptable to incorporate multiple P2P protocols and protocol variants in order to provide some universality in design.

The swarm is dynamic and peers join and depart, wherein the enhanced tracker 350 maintains an on-going peer-list. The enhanced tracker 350 incorporates enhanced peer selection software 360 that provides intelligent peer selection and coordinates with the enhanced origin seeds 390. This coordination includes the use of enhanced communication messages 355 with the enhanced tracker 350 to allow for special communications. Further features include enhanced scaling and quality-of-service for P2P-based content distribution. The technology and methods described herein offer substantial advantages over existing P2P-based distribution technologies, particularly for swarms with flash crowds.

In one embodiment, using customized portions of code in the enhanced tracker 350 and customized portions of code in the enhanced origin seed(s) 390, the system supports communications outside the BitTorrent protocol. The use of enhanced messages 355 between the enhanced tracker 350 and the enhanced origin seeds 390 can also help to reduce the likelihood of miscreant peers monopolizing the enhanced origin peers. It should be understood that there may be a large number of peers in any given overlay network of peers 370 and any number of P2P systems operating on a particular content download wherein one or more enhanced P2P systems 310 can operate alongside other non-enhanced P2P systems.

Some of the advantages of the present system and methods include significantly faster content download performance for flash crowd participants; significantly enhanced predictability (i.e., less variation) in download times among swarm users in a large swarm; and reduced amount of content that miscreant peers obtain from the enhanced origin seed(s).

A sample section of pseudo code is included herein for the peer selection processing according to one example of the flow. Notice that even within this example code segment, the peer selection decision can change based upon swarm condition and/or status of the requesting peer. The peer selection software, whether executed in the enhanced centralized tracker or in the distributed tracker peers, processes a non-random peer-list that is disseminated to peers in the network. In this example, there are certain additional commands/instructions outside of the present P2P protocols for communications between the enhanced tracker and other origin processes.

```
*********************START PSEUDOCODE*****************
Copyright 2007 General Electric Company
pseudo-code for a routine used by the enhanced Tracker to prepare
and send an ANNOUNCE_RESPONSE message in response to receipt of
an ANNOUNCE_REQUEST message from a peer in the swarm.
Definitions
-----------
requesting_peer = the peer in the swarm that has just sent an
ANNOUNCE_REQUEST message to the
Tracker
num_peers_needed = upper limit of number of peers to include on
this peer_list
nNSeed = number of peers in the swarm that the Tracker believes are
not seeds
num_PSeed_peer_capacity = sum of the allowable peer-list sizes for
all the origin
seeds in the swarm
peer_list = an intermediate list of peers
start_set = a Tracker-based grouping of non-seeds (See note below.)
that are
relatively newly known to the Tracker
(Note: Tracker Information can sometimes be stale. In the context
of this routine,
a peer is considered to be a seed or a non-seed based upon the latest
information
that the tracker has rather than the instantaneous status of the peer.)
(Note: The value of num_peers_needed is typically the minimum of
the following
three values:
* the number of peers requested by requesting_peer
* the maximum number of peers allowed per request
* the number of appropriate peers in the swarm -- as far as the
Tracker knows )
routine peer_selection(requesting_peer, num_peers_needed)
   initialize peer_list as empty, but with a maximum capacity of
        num_peers_needed
   if (requesting_peer is a non-seed) and
      (nNSeed < num_PSeed_peer_capacity)
        add requesting_peer to peer_list
        send PUSHED_PEER_LIST message with peer_list to
            appropriate origin seed
        remove requesting_peer from peer_list
   if num_peers_needed = 0
      add nothing further to peer_list
   else if requesting_peer is a non-seed
      if this non-seed is just entering this swarm
         if requesting_peer is one of the first non-seeds to enter
              the swarm
            add nothing further to the list
         else
            add all known other peers in requesting_peer's start_set to
                the peer_list
            reduce capacity of peer_list by the number of this
                requesting_peer's start_set that are not yet known by
                the Tracker
            if reasonably possible and until the peer_list reaches
                capacity, add other non-origin peers randomly and
                non-redundantly to the peer_list
      else
         if reasonably possible and until the peer_list reaches capacity,
             add other non_origin peers randomly and
             non-redundantly to the peer_list
   else if requesting_peer is a origin seed
      if reasonably possible and until the peer_list reaches capacity, add
          appropriate non-seeds randomly & non-redundantly with
          bias toward younger non-seeds to the peer_list
   else if the "Denial of Service" probability is high
      add nothing further to peer_list
   else
      if reasonably possible and until the peer_list reaches capacity, add
          non-seeds randomly and non-redundantly (with slight bias
          toward younger non-seeds) to the peer_list
   send ANNOUNCE_RESPONSE message to requesting_peer with
      peer_list
end routine
****************END PSEUDOCODE***********************
```

In a typical P2P system, content is exchanged among peers. However, before a peer can begin to exchange content, it must connect to one or more other peers. And, in order to connect to other peers, a peer must first obtain the addresses of these other peers. As noted, in a BitTorrent system, the tracker provides a peer-list (list of peer addresses) to each peer that requests one.

FIG. 4 is a flowchart showing a high-level view of the enhanced peer-list providing process for a P2P system according to one embodiment. In this enhanced processing example 400, the peer-list formation process is dependent upon the condition of the swarm and/or the status of the requesting peer at the time the request is made. That is, there is a temporal component to this process. The temporal synchronization in one example is accomplished by the receiving a peer-list request from a requesting peer 410, however other embodiments are possible. In one example, the requester is identified.

The conditions of the swarm and/or the requesting peer are ascertained 420 to allow for an improved peer selection strategy. There are many features that can be used to assess the state of the swarm and/or the state of the requesting peer.

Some of the variables for the swarm include: number of non-seeds in the swarm; number of non-origin seeds in the swarm; number of origin seeds in the swarm; rate of change of number of non-seeds in the swarm, rate of change of number of non-origin seeds in the swarm, rate of change of number of origin seeds in the swarm, historical patterns of prior usage, and combinations thereof.

One example of processing for the swarm conditions includes biasing the peer selection toward younger peers or biasing the peer selection for older peers.

Some of the requesting peer conditions include: type of peer requesting the peer-list (e.g., non-seed, non-origin-seed, origin seed), age of peer, amount of content lacking by requesting peer, percent of content lacking by requesting peer, total number of times requesting peer has requested the peer-list, the elapsed time since last request by requesting peer for the peer-list, requesting peer's upload rate, and requesting peer's download rate. The peer information may also include the piece set content identification received and/or lacking by the peer so that the tracker or resource manager. Knowledge of the device type is a further detail that can be used in the processing.

An example of some of the processing for the requesting peer includes omitting all origin seeds from the peer-list being generated for any peer, omitting all seeds from the peer-list being generated for any seed, biasing the peer selection for the peer-list based on network locality, and biasing the peer selection for the peer-list based on geographic locality, generating an artificial non-empty peer-list for any non-origin seed when the ratio of seeds to peers in the swarm exceeds a programmable threshold, and combinations thereof. The processing and conditions of the swarm conditions and the requesting peer conditions are not mutually exclusive and may be combined for the processing of the selective peer-list.

These status conditions are typically assessed based upon best available information. In the BitTorrent example, the tracker (enhanced or not) will typically not know the exact number of non-origin seeds in the swarm at any instant due to the fact that some of its information is "stale" because of infrequent reporting from peers.

One optional step depends upon whether a resource manager is employed in the system. Any significant changes in the swarm's condition are reported to the resource manager 430 by the tracker via the enhanced message TRACKER_REPORT. This information enables the resource manager to effectively allocate the origin resources among its swarms. This allocation may be performed using the enhanced messages such as CONFIGURE_TRACKER and CONFIGURE_PEER.

If the conditions of the swarm and/or the requesting peer warrant, origin processes associated with this swarm will be notified via enhanced communications messages 440 of appropriate actions that they should take. There are many possible conditions and resultant actions. Two examples will be given for illustrative purposes. For example with regard to BitTorrent, an enhanced origin seed could be sent a PUSHED_PEER_LIST message (in which the enhanced tracker's requesting peer is the only peer on the peer-list) if the requesting peer is a non-seed and the size of the swarm is very small—less than the sum of the capacity of the peer-lists of all origin peers in this swarm. Another BitTorrent example is that when most of the non-seeds in the swarm are attributable to a flash crowd, all of the origin seeds associated with that swarm can be directed to limit—by time and/or volume of content sent—the duration of their peer connections. These types of enhanced messages are communicated among origin processes.

The selection of the most appropriate peer selection algorithm is performed 450, wherein the appropriate algorithm is based on factors such as conditions of the swarm and the requesting peer. There are many possible conditions and resultant peer-lists. Several BitTorrent related examples are provided for illustrative purposes. For example, if the requesting peer is a seed, the peer selection algorithm could randomly select non-seeds (versus randomly select from all peers) because a pair of seeds has no need to exchange content since they both have all the content. In another example, if the requesting peer is a non-origin seed, the swarm is very large (100's of thousands of peers) and the peers in the swarm are mostly seeds, then the peer selection algorithm could simply be to yield the empty peer-list to avoid having the few non-seed peers—by effect rather than by intent—from being DOS (denial of service) attacked by this large population of seeds.

According to one embodiment, the peer-list that resulted from the peer selection processing is sent to the requesting peer 460.

Figure 5:
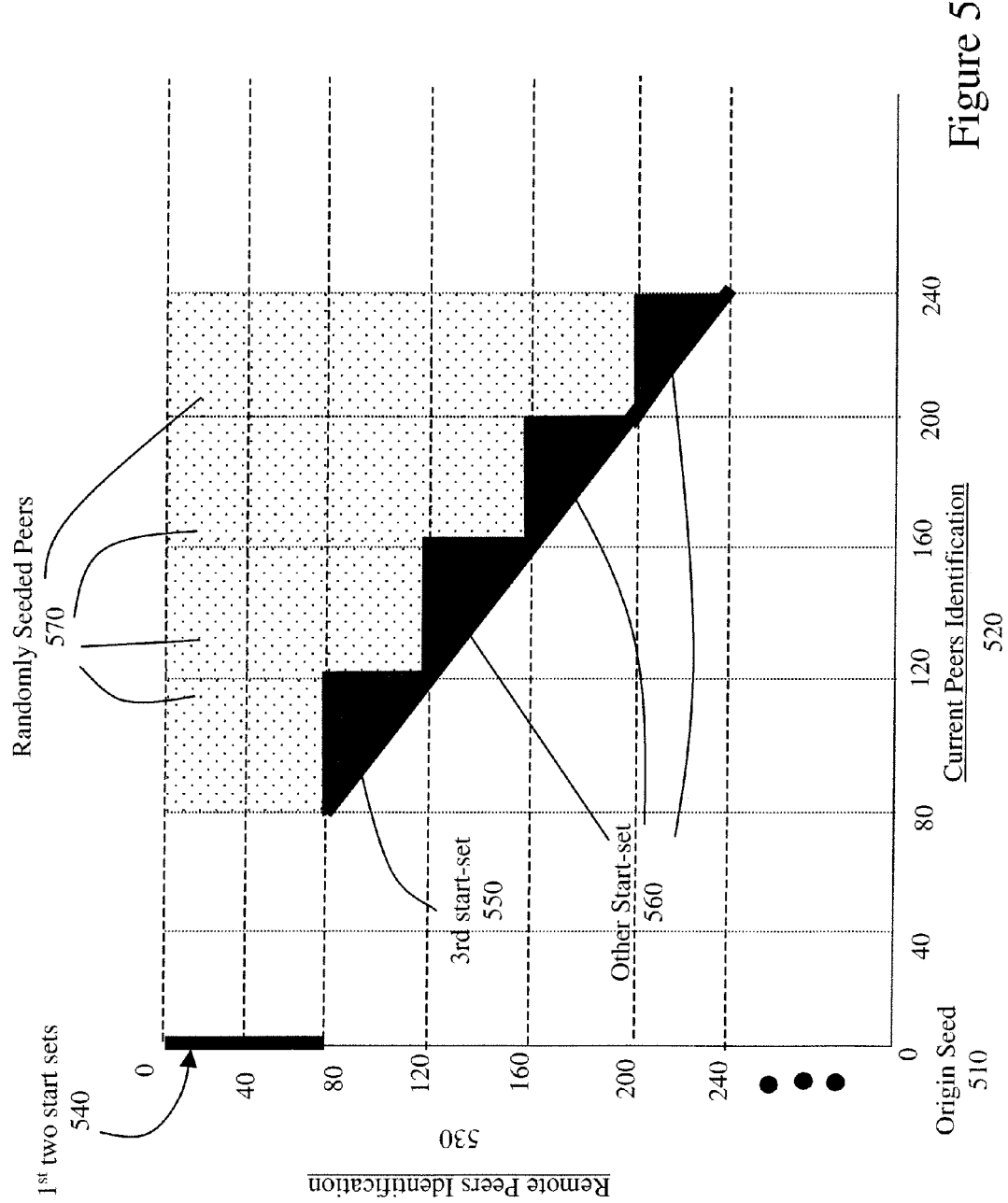
FIG. 5 is a graphical presentation of a peer selection strategy according to one embodiment.

Referring to FIG. 5, one embodiment for enhanced peer selection management for newly registering peers is depicted. It should be noted that the numbers and ranges used are for illustrative purposes and subject to design and performance criteria. For this example, it is assumed that (1) each peer is allowed to connect to eighty other peers; (2) the start-set is set to be forty peers; (3) there is exactly one enhanced origin peer in the swarm; (4) the enhanced origin seed is the first peer to join the swarm; (5) the upload bandwidth of enhanced origin seed is significantly higher than the download bandwidth of the typical peer in the swarm; (6) the number of peers that the enhanced origin seed can unchoke is approximately equal to the maximum size of its peer-list which is approximately equal to the enhanced origin seed's upload bandwidth divided by the expected average download bandwidth of its peers; (7) the size of a peer-list generated by the enhanced tracker in response to any peer's request for a peer-list size is capped at fifty; (8) the peers are numbered in the order that they join the swarm (that is, the order in which they register with the enhanced tracker); and (9) the enhanced origin seed is assigned peer ID zero.

This figure illustrates the simulated overlay network specified by the enhanced tracker at the onset of the swarm. This overlay network established by the enhanced tracker applies only to the first peer-list presented to each non-seed peer and only at the onset of the swarm.

Assuming the enhanced origin peer is the first peer to register with the tracker, it will get no peers on its peer-list since the enhanced tracker has no other registered peers to give to it. The next two peer start-sets worth (2×40=80) of non-seed peers that register with the tracker will also be given empty peer-lists—despite the fact that the enhanced tracker knows about other peers. However, the enhanced tracker also uses the enhanced message PUSHED_PEER_LIST to send peer-lists with these peers to the enhanced origin seed(s), and the enhanced origin seed(s) will initiate connections to those non-seed peers. This feature is illustrated by the vertical solid line corresponding to the first two start-sets 540 given to the origin seed 510. As can be seen, the membership of each start-set is completely disjointed with respect to the membership of every other start-set 550, 560.

For the third start-set 550 worth of non-seed peers to register with the tracker, the tracker will generate a peer-list that includes all registered peers in the requestor's start-set plus eleven (1+|track peer-list limit|−|peer-set|=1+50−40=11) more peers chosen randomly from the peers that are known to the enhanced tracker but not in the requestor's start-set. After the third start-set 550 worth of new (initially registering)

non-seed peers, the enhanced tracker in this example will use the same strategy of grouping by start-set as it did for the third start-set worth.

Each peer pair connection is bi-directional, which is why the enhanced tracker only tells one peer in each of the peer pairs in a start-set about the other, and it is generally the younger peer that is told about the older peer. As shown in FIG. 5, this is why only the upper triangular portion of this graph has been populated. That is, the current peer 520 (along the x-axis) is told about the remote peers 530 (along the y-axis). Each dark shaded triangle in FIG. 5 corresponds to a start-set other than the first two start-sets. So for example, assume that peers are numbered in the order that they register with the enhanced tracker starting with the origin seed 510 at peer 0, and consider the third start-set 550—that includes peers 81 through 120. Peer 81 is initially not told about any peers in its start-set because there are no older peers in its start-set. Peer 82 is initially told about peer 81 because it is the only older peer in its start-set. This pattern continues, finishing with peer 120 that is told about peers 81 through 119 that are all the other peers in its start-set—all of which are older than peer 120. Similarly, this overall pattern continues for each of the subsequent other start-sets 560.

Additionally, there are lightly shaded rectangles 570 that correspond to the "low density" eleven (1+|track peer-list limit|−|peer-set|=1+50−40=11) randomly selected peers 570 that are included on each new peer's peer-list. Since the enhanced tracker is not omniscient, a new peer's first peer-list can only include the identifiers of older peers in the swarm.

Whenever the swarm has fewer non-seed peers than the total combined peer capacity of all of the origin peers and a new non-seed peer is registering with the tracker, the tracker can use the enhanced message PUSHED_PEER_LIST to notify the appropriate origin peer. This will ensure that small swarms make effective use of the enhanced origin seeds.

Enhanced Communications Protocol

According to the BitTorrent protocol, there are several means for a peer to learn about other peers. The first is when a peer asks the tracker (via an ANNOUNCE_REQUEST message in the BitTorrent protocol) for a list of peer addresses, and the tracker responds by sending it a peer-list (via an ANNOUNCE_RESPONSE message in the BitTorrent protocol). The second is when a remote peer attempts to connect with the current peer (via a HANDSHAKE message in the BitTorrent protocol). A third mechanism is a peer exchange that can be used in distributed tracker systems.

In one embodiment, the enhanced tracker, at its discretion, is allowed to send a peer-list to any peer that supports the enhanced message PUSHED_PEER_LIST. Another embodiment only communicates PUSHED_PEER_LIST messages between the enhanced tracker and the enhanced origin seed(s). The PUSHED_PEER_LIST messages are particularly effective early in a swarm's life-time, especially if the enhanced tracker is not including origin seeds on peer-lists.

In one embodiment, whenever a new non-seed peer is registering with the enhanced tracker and the enhanced tracker is aware of fewer non-seed peers than the total peer capacity of all of the origin peers in the swarm, the enhanced tracker should use its enhanced message PUSHED_PEER_LIST to notify the appropriate enhanced origin peer. This will ensure that small swarms make effective use of the origin seeds.

Another feature includes certain control functions related to the peer behavior. Another type of message, called CONFIGURE_PEER, is used for controlling certain fundamental peer behaviors such as: 1) a particular peer's upload bandwidth; 2) a particular peer's tracker re-request interval; 3) how much a particular peer should limit its connect time for each remote connection; 4) whether a particular peer sends CHOKE messages; 5) whether a particular peer should hibernate/unhibernate; 6) whether a particular peer should refuse connections from other peers; and 7) whether a particular peer should cycle through its content during upload (like superseeding). In one embodiment, use of CONFIGURE_PEER messages would be restricted such that they would be sent only from the enhanced tracker to enhanced origin seeds.

Another type of message, called SCOUT_REPORT, is used to report the status of a collection of peers in the network. Typically, a SCOUT_REPORT message is generated by an origin scout and sent to the enhanced tracker. The scout report typically contains recent peer status information that can augment the enhanced tracker's knowledge of the peers in the network and improve the peer selection processing.

Tracker Peer-List Selection

According to one exemplary embodiment for the BitTorrent reference implementation, the tracker responds (via an ANNOUNCE_RESPONSE message) to each peer request (via an ANNOUNCE_REQUEST message) for a peer-list, by randomly selecting peers for that peer-list.

Peer-list generation strategies utilized by the enhanced system include at least the following: 1) do not include any seed on any peer-list generated for a seed, since they can be of no benefit to each other; 2) do not include any origin seed on any peer-list (It should be understood that this may be done for security reasons, as it helps to reduce the probability of these key assets being attacked and/or abused by malicious peers.); 3) when preparing a peer-list to be sent to a seed, create a controllable bias toward including younger peers as they will tend to have greater need; and 4) if the ratio of seeds to all peers in the swarm exceeds controllable parameters, then proportionally increase the number of "artificial" non-empty peer-lists given to non-origin seeds by the enhanced tracker In a huge swarm where the number of seeds far exceeds the number of non-seed peers, this should prevent the seeds from effectively (and unintentionally) creating a denial of service attack on the few remaining non-seed peers in a swarm. In a tiny swarm, this will reduce the number of redundancies issued by the tracker via its peer-lists.

In a further aspect, the enhanced tracker can dynamically change the peer selection method that it uses. These changes can be based on criteria such as the condition of the swarm and/or the condition of the requesting peer. A control algorithm can incorporate a number of variables to determine the switching point and the optimal peer selection algorithm as well as dynamically adjust operational parameters.

Of all the processes associated with a swarm, the tracker typically has the most global view of that swarm. For example, the tracker alone is aware of the rate that peers are joining the swarm. As such, the enhanced tracker can assess the swarm's condition and change its peer selection algorithm based upon that condition. For example, the peer selection algorithm might change when dealing with a flash crowd versus a steady state crowd.

Some of a tracker's information about a swarm may be less than current because the swarm's peers provide the tracker with information infrequently. One embodiment uses one of more origin scouts as a means of gathering more current information about peers and providing that information to the tracker via an enhanced message, SCOUT_REPORT. An origin scout can interact with other peers using the standard P2P protocol such as BitTorrent, but unlike a conventional peer, its primary purpose is not sharing content. The origin scout gathers information about non-origin peers, and it provides that information to the tracker. The gathered information includes such things as whether the peer is alive and the how much of the content that peer still needs to obtain. With more current information, the efficiency of the enhanced tracker's enhanced peer selection is improved.

The enhanced tracker also receives information about a peer as it requests a peer-list. This peer specific information can also be used to determine the appropriate peer selection algorithm. For example, the peer selection algorithm used when dealing with a non-seed peer just joining the swarm might be different from the peer selection algorithm used when that same peer subsequently requests another peer-list. Another example is that the peer selection algorithm used for generating a peer-list for an origin-seed might be quite different from the peer selection algorithm used for generating a peer-list for a non-seed. In this latter example, it would be highly desirable for the enhanced tracker to put seeds on the peer-list being created for a non-seed, while it would be counterproductive to put seeds on the peer-list for an origin-seed.

When a swarm is initiated with pent up demand (i.e., a pre-existing flash crowd), the tracker should not usually use random selection for the associated peer-lists. A controlled network layout is much more effective. In addition, when a non-seed peer with no content joins a swarm, the tracker should also use better judgment than simple random selection in selecting peers for inclusion on its peer-list.

Resource Management

Figure 6:
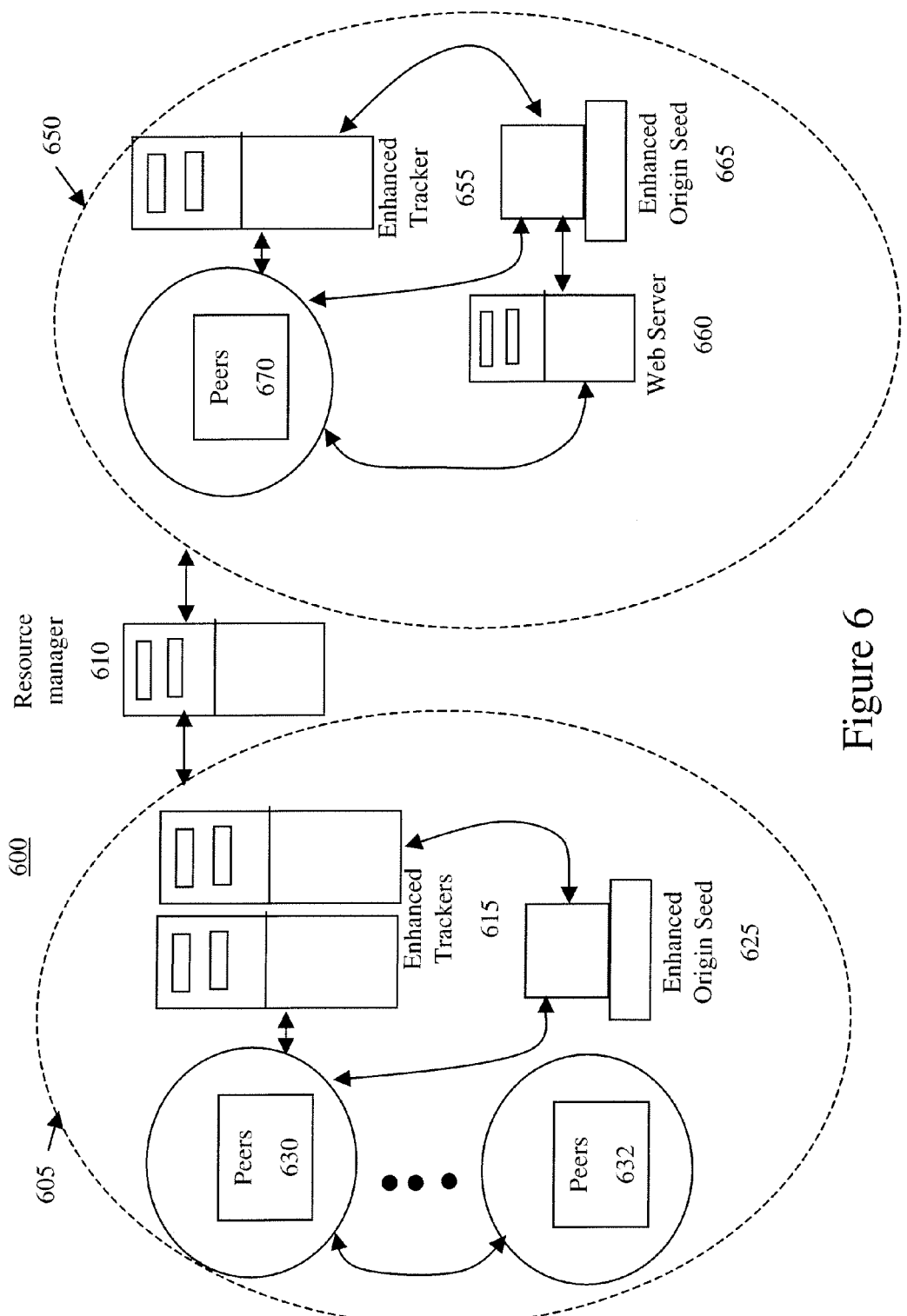
FIG. 6 is a block diagram showing a resource manager for P2P systems according to one embodiment.

FIG. 6 shows a further embodiment in which a resource manager node 610 is utilized to manage an organized system 600 of multiple swarms. The resource manager node is coupled to the network and manages the content distributor's resources to provide an optimally controlled and balanced system. For example, the resource manager oversees the operation of multiple swarms and allocates/deallocates key resources (i.e., trackers, origin seeds, and origin seed bandwidths) from swarms as demands warrant.

It should be appreciated that some (enhanced and/or non-enhanced) trackers manage many swarms concurrently. Web servers usually provide access to many swarms via the torrent metafile downloads. Origin seeds (enhanced or non-enhanced) can serve many swarms concurrently with different priorities. One embodiment of this is to control the per swarm upload bandwidth allocations of each enhanced origin seed as the mechanism for controlling swarm prioritization.

Referring again to FIG. 6, one or more systems 605, 650 are coupled to a resource manager 610. In this example, the first system 605 has an origin seed 625, enhanced trackers 615 and multiple swarms of peers 630, 632. The enhanced trackers 615 have the peer-list for the non-seed peers 630, 632 and the origin seed 625. The origin seed 625 contains the formatted content according to the P2P protocol for dissemination and also has the enhanced/additional software to provide the peer selection along with the communications with the enhanced trackers 615.

The second system 650 has a web server 660, origin seed 665, enhanced tracker 655 and peers 670. The resource manager 610 monitors the behavior of the swarms under its control and manages the allocation/deallocation of resources to those swarms to facilitate the desired objective—which might be the quality of service to the average user. If the number of non-seed peers in a swarm begins to increase substantially, the resource manager can increase the resource allocation for that particular swarm. Conversely, if the number of non-seed peers in a swarm begins to decrease substantially, the resource manager can decrease the resource allocation for that particular swarm. Of course, the resources available are not infinite, so the resource manager must balance the needs of all the swarms for which it is responsible.

For example, in one embodiment there can be multiple swarms for a single piece of content in the system 605 and the resource manager 610 can play with the peer-lists and dedicate the trackers and origin seeds as needed. It can also increase the bandwidth of the origin seed(s) so that the content pieces are passed along to non-seed peers in a timelier manner. One of the embodiments includes both enhanced and non-enhanced systems such that the enhanced software allows operation with legacy systems that do not have the enhanced software.

The resource manager 610 is able to monitor the activity of the swarm(s) in several manners. According to one embodiment, the tracker(s) has information about what and when each peer has communicated with the tracker(s) and the amount of content held by each particular peer and/or the amount of content remaining to be downloaded. In other embodiments, the system logs peer completion statistics.

Hybrid Delivery

As any tracker intermittently interacts with the peers, it gains insight into the number of peers, the growth of the swarm, and the amount of flow in a particular swarm. In effect, it obtains periodic bandwidth measurements that aid in balancing loads among the available resources.

Proxy servers are typically deployed by ISPs, companies, and other organizations to better manage Internet traffic within their networks. Proxy servers are typically free to use by content providers as they are deployed by $3^{rd}$ party organizations to alleviate congestion on scarce network resources and to enhance the quality-of-service to users.

In contrast, CDN services typically charge content publishers for delivering content through their CDN service infrastructure. Hence, CDN services presently represent a direct cost and the proxy servers, when available, are generally preferred over CDN services.

Figure 7:
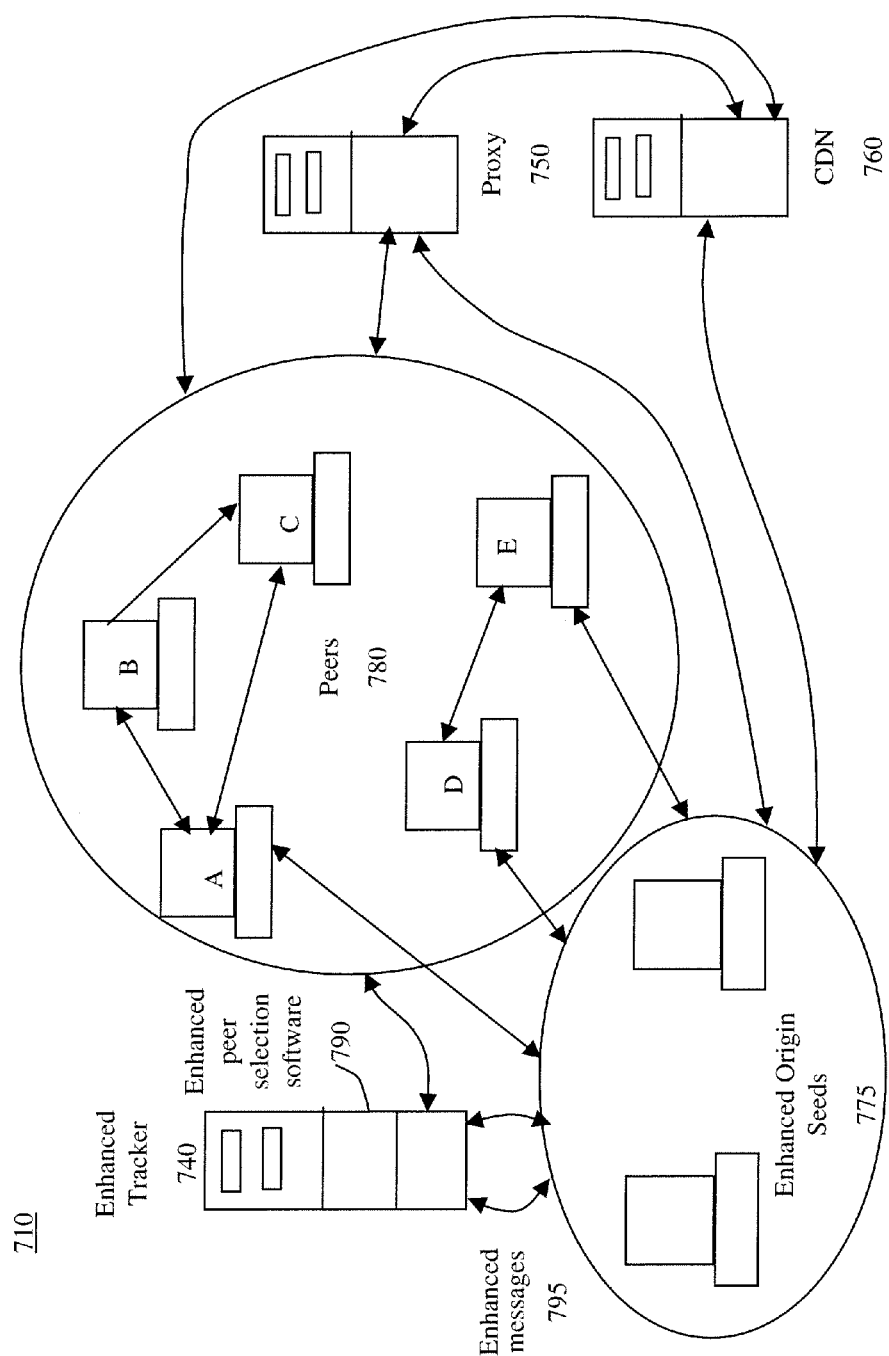
FIG. 7 illustrates the enhanced peer selection deployed with a hybrid P2P network configuration according to one embodiment.

Referring to FIG. 7, the enhanced peer selection system 710 is implemented into a hybrid network such that there is a proxy HTTP server 750 than can serve as a temporary cache location for content that is being downloaded to the peers 780. In one embodiment, this network includes a content delivery network (CDN) and the peers can utilize proxy HTTP servers as additional sources for content downloads. The CDN HTTP servers 760 can function as auxiliary content sources to supplement bandwidth provided by HTTP proxy servers 750, peers 780 and origin seeds 775.

In one aspect, the enhanced tracker 740 can communicate using both enhanced messages 795 and standard P2P protocol to communicate with the enhanced origin seeds 775.

Note that the ability to leverage Proxy HTTP services 750 is not a requirement in the disclosed system, but is merely a further embodiment employing the caching functionality. Likewise, the usage of CDN HTTP services 760 is not required; however, origin web server(s) are used to provide HTTP content sources.

According to one example, if there are ISP proxies and CDN servers in addition to the P2P infrastructure, there can be a prioritization of the P2P communications such that a first priority is for the content to download by the proxy (ISP hosted), a second priority can be P2P, and a third priority can be CDN. Other prioritization schemes are possible dependent upon design criteria.

Certain hybrid P2P technologies enable streaming while simultaneously allowing content to be stored locally on peers, wherein the content files may have some form of content protection mechanism such as Digital Rights Management (DRM) or encryption that provides content publishers with control over content access.

Locality

A further embodiment of the system relates to the Internet backbone that refers to the geographical network topology of the servers that relay data. The backbone is non-uniform and data transferred from one part of town to another may actually travel via network resources located in other states or countries. Furthermore, the backbone tends to be rather dynamic, and if a network element (e.g., routers, switches, DNS servers, etc.) crashes or has problems, network traffic is quickly re-routed. Despite these issues, there are some sound reasons to use the shortest network path length between the nodes, for example, the seeds and peers. Specifically, shorter path lengths are more likely to be contained within a single ISP's network infrastructure and thus present lower demands on scarce network resources (e.g., peering relationships, Tier-1 ISP connections, etc.). Furthermore, shorter path length typically translates to higher TCP bandwidth and thus faster data transmissions.

By way of illustration, BitTorrent tracker implementations typically use random peer selection. Network locality among peers is completely ignored. Thus BitTorrent stresses critical ISP network resources (e.g., ISP 'peering relationships' and upload bandwidth). Hence, ISPs want to keep the P2P traffic within their own network.

It is generally recognized that the peer-list should be biased by peer locality, and the present system can benefit from some network topology-based selection heuristics.

Figure 8:
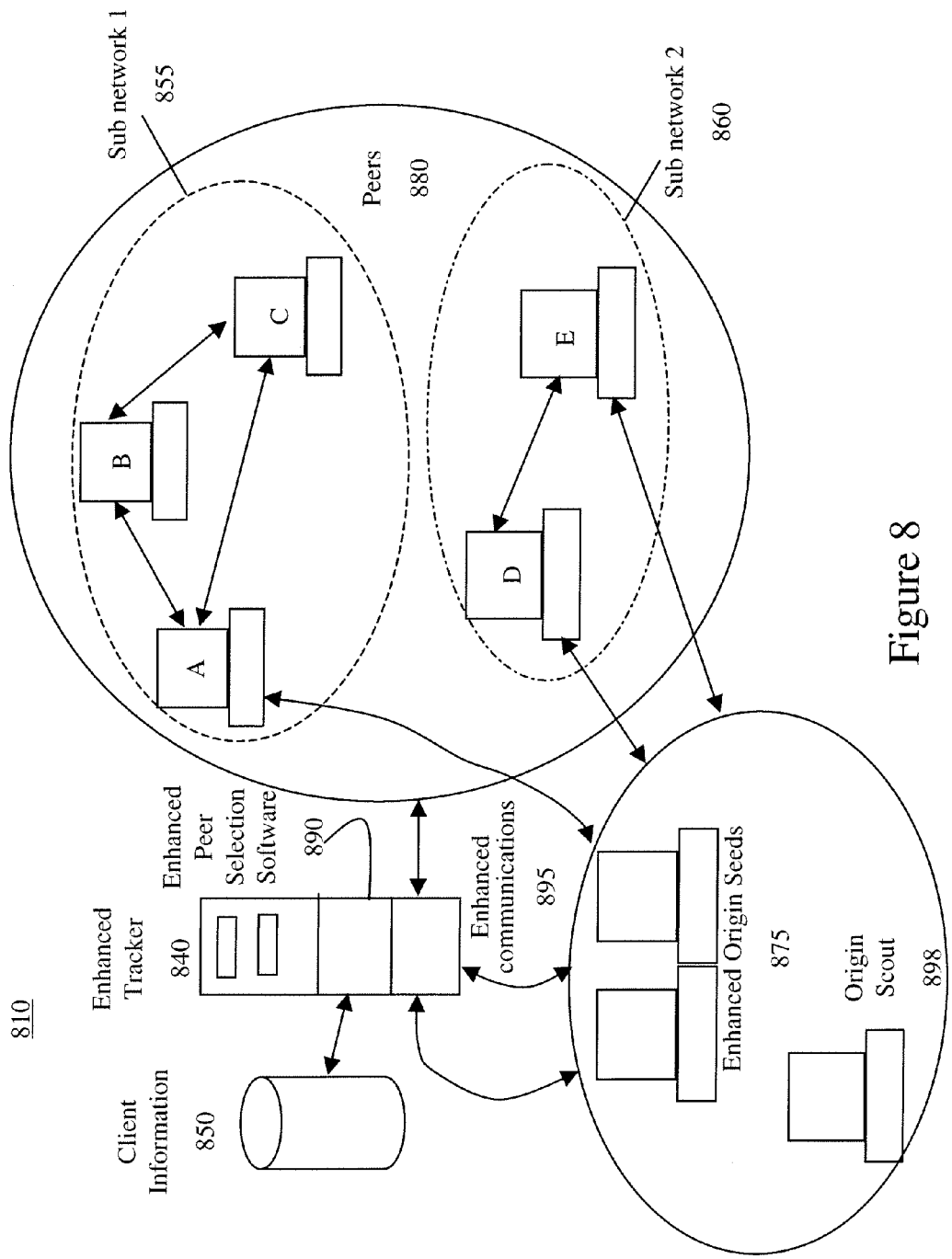
FIG. 8 illustrates the enhanced peer selection deployed with a geographic overlay configuration according to one embodiment.

Referring to FIG. 8, an example of implementing a network overlay with the enhanced peer selection system is shown according to one embodiment. There is an enhanced tracker 840 coupled to the network that communicates with the peers 880 and the enhanced origin seeds 875. As previously noted, the enhanced tracker can use enhanced protocol communications 895 to communicate with the enhanced origin seeds. The enhanced tracker 840 can also obtain and maintain the Client Information storage 850 that may include such information as the peer IP addresses, ports, and network topology for the various sub networks 855, 860 of peers. In addition, there are various client authentication and security issues may be included in the client information storage. Security credentials includes such aspects as user names, passwords, public/private keys, and biometrics. The client authentication such as user identification and client identification can be utilized along with authentication of peer software. The client information can also include network elements such as the type of network device (e.g.: set-top box (STB), personal computer (PC), mobile), existence of firewalls, NAT, as well as port information. In addition, the system can use information of peer locality to identify peers on a local area networks (LANs) having the same network segment.

This information can be gathered in several manners, such as by using a network 'traceroute' to enumerate the network route from a peer to a specified network resource and geographic IP location services that map an IP address to specific geographic area such as a city, town, or locale. With this locality information, the tracker 840 can group peers together that are 'near' each other as well as couple the origin seeds to 'closer' peers.

Network locality as described herein can also entail the network traffic aspects related to firewalls and network address translation (NAT) that can impact the end-to-end connectivity between the swarm and the peers. The firewalls, blocked ports and various forms of network address translations may block certain content files in the upload and/or download flow. Certain techniques detailed herein use certain criteria in determining the selective peer list and according to one aspect the peer selection processing can include variables that include noting whether the peer has some form of NAT or other firewall issues. For example, a requesting peer that has a firewall may be unable to upload content to other peers and unless accounted for in the peer selection processing, this peer may be given a lower priority on subsequent peer-lists.

The P2P overlay network topology detailed herein are very general and have broad applicability for other existing forms of P2P content distribution as well as future formats and variants.

A further embodiment refers to the use of the condition based peer selection with or without enhanced communications. The enhanced tracker utilizes its most current information to determine the most appropriate peer selection. Even without enhanced messages, the peer selection processing continues and provides for better content distribution than other systems. In one embodiment, one or more origin scouts are used to gather information about other peers and to provide that information to the enhanced tracker via the enhanced message SCOUT_REPORT. This keeps the tracker's information about peers and the swarm more current and thereby improves the efficacy of its peer-lists.

Distributed Tracker Systems

Some of the unique aspects of the enhanced peer selection P2P system include the structured network overlay topology used among peers in a distributed swarm, and the enhanced messages communications between the enhanced tracker mechanisms and enhanced origin seed. These enhancements are compatible with other features described herein and thus may be combined.

One embodiment of the enhanced system operates without dedicated tracker servers and instead employs distributed tracker software on peers that can act as a tracker to manage peer-lists. Furthermore, while a dedicated origin seed was discussed in certain implementations, other embodiments do not require such a dedicated origin seed, since the origin seed can drop out or hibernate in a particular swarm.

Thus, according to one embodiment, the enhanced peer selection capability can be implemented without a dedicated tracker and even without a dedicated origin seed. The software algorithms for the peer selection and the additional communications can be enabled on different hardware platforms and installed by different mechanisms. For example, a self-extracting program or stub can be downloaded or installed and provide a link between the computing device maintaining the peer-list activity (functional tracker) and the computing device with the P2P formatted content file (functional origin seed).

A further embodiment of the enhanced system operates in a distributed tracker peer environment where decentralized trackers are combined with distributed hash tables (DHT). In this embodiment, the DHT services are used to map distributed tracker torrents to peers that serve as the functional enhanced tracker thus enabling swarms to operate without a centralized tracker or when a tracker becomes inoperative.

There are many implementations for the system and processing detailed herein. One aspect includes the acceleration of peer-to-peer downloads with a content provider having content files, wherein the origin seed(s) store the formatted content files, and a tracker maintains a list of peers in a swarm. Typically the tracker attempts to maintain an accurate list however the peers join/depart the swarm dynamically and the list may become stale. The tracker responds to each peer requesting a peer-list by returning a selective peer-list consisting of locators for some subset of peers in the swarm. The tracker uses one or more peer selection algorithms to determine the appropriate subset of peers. The tracker also uses enhanced protocol messages to proactively send peer-lists to origin seeds. Optionally, the tracker also uses enhanced protocol communications to inform the resource manager of significant changes in the condition of the swarm.

The peer selection processing in one aspect includes such factors as omitting seeds from the peer-list sent to another seed, omitting origin seed(s) from any peer-list, biasing the peer-list toward younger non-seed peers, changing (typically increasing) the number of empty peer-lists sent to seeds when the ratio of the number of seeds to the number of non-seed peers exceeds a specified parameter, and biasing peers according to peer locality.

One method for accelerating a peer-to-peer download of a content file, comprises uploading the content file, formatting the content file according to a peer-to-peer protocol to produce a formatted content file having a plurality of content pieces, registering the formatted content file with a tracker and origin seed(s), wherein the tracker and origin seed(s) have a peer selection capability, publishing availability of the content file, managing a plurality of peers using peer selection strategy(s), and exchanging the content pieces among the peers. The tracker includes at least one of a tracker server, a peer with tracker software, and a server with tracker software. Registering the formatted content file with the tracker is transferring a metafile with information about the formatted content file to the tracker.

The methods further comprise communicating between the tracker and origin seed(s) for controlling origin seed peer functions including at least one of: a particular peer's upload bandwidth; a particular peer's Tracker re-request interval; how much a particular peer should limit its connect time for each remote connection; whether a particular peer should refuse connections from other peers; and whether a particular peer should cycle through its content during upload (like super seeding).

OTHER EMBODIMENTS

Fundamentally, the existing peer-to-peer technologies work adequately under most circumstance. However, the quality-of-service experienced by users seriously degrades in flash crowd situations where the total number of users participating in a swarm grows rapidly. Content download times become highly variable and non-predictable, and the overall performance and end-user experience gets worse as more users participate in a P2P swarm. The system and techniques according to one embodiment are an enhancement to existing peer-to-peer technologies and is protocol-compliant so that it will work with legacy user agent software. Hence, the present system can be implemented directly by content publishing companies and by third party technology companies (e.g., Akamai, Amazon, Pando, and BitTorrent.com) that operate the server infrastructure on behalf of other companies.

The system can be a part or component of content distribution service offering. In one aspect, the system can be implemented in the content distribution server infrastructure software (specifically the enhanced tracker and the enhanced origin seed), wherein the software will be operated by content distribution services.

While primarily described in terms of BitTorrent, the systems and methods herein are applicable to other P2P protocols and designs, and other company products and services would benefit from leveraging this technology such as Akamai/RedSwoosh, VeriSign/Konitiki, iTiva Networks, Amazon S3, Vuze, and BitTorrent.com.

In addition, although it has been noted that certain embodiments employed P2P for large size files such as movies and large video files, the systems and techniques described herein are not limited to large video files. The enhancements via the peer selection are applicable to any digital data. For example, large software systems and updates, TV guide information, or other application database updates could be distributed via this technique. Another example is that podcasting of various audio data files benefit by enabling the podcasters to meet the demands of radio programs.

Streaming data and progressive downloads are also enhanced by the download acceleration possible with the enhanced peer selection. This enhanced quality of service provided by the present system is particularly relevant for P2P assisted digital content streaming.

One of the embodiments is for a system enabling larger content providers to use the Internet to deliver digital content to users that is both cost effective for the content provider and high quality for the users. This offers many advantages including the reduction of the miscreant peer problem as the content provider will have a value-added environment to provide the content faster.

Another aspect relates to the use of super-seeding, wherein the origin seed is temporarily or initially part of the swarm but leaves the swarm after an entire copy of the content is posted. The super-seeding feature is implemented by some BitTorrent clients to minimize the amount of data uploaded by the origin seed and is typically used when there is only one seed. In the super-seeding processing, the origin seed at the outset claims to have no pieces, and as peers connect, the origin seed informs a requesting peer that it has received a new piece that has not yet been sent to any other peers. The origin seed then unchokes the requesting peer and allows it to download that piece. The origin seed will subsequently not upload any other piece to the requesting peer until the seed receives confirmation that the piece has been uploaded to another peer. The purpose of the super-seeding strategy is to minimize the amount of bandwidth required of an origin seed. Furthermore, the super-seeding functionality is implemented directly in a peer (preferably an origin peer) and does not require any changes to the swarm's tracker software. Hence it is not capable of manipulating the peer overlay network topology.

Supporting Data

Part of the original motivation for the systems detailed herein was to better understand the swarm dynamics for P2P distribution. The methods used to validate the benefits of the disclosed system were based on a unique discrete-event based simulation capability that allowed swarm studies ranging in size from a few peers to several hundred thousand peers. Some aspects of this simulation environment have been disclosed in "A Case Study in Modeling Large-Scale Peer-to-peer File-Sharing Networks Using Discrete-Event Simulation" by Carothers et al, which is incorporated by reference for all purposes.

The P2P simulator was coupled to an Internet connectivity model that provides connectivity and bandwidth models for all of the nodes and links present in the simulated network. Since the Internet topology is dynamic, an accurate and timely connectivity graph of the Internet is typically not possible. One embodiment features two components, namely the statistical model of the Internet backbone, and a detailed neighborhood-level network model for lower-tiered ISPs. While the Internet backbone is non-uniform, the neighborhood-level networks are very uniform, and have evolved based on the current Internet connection technologies (e.g. cable or DSL broadband services). In particular, these broadband device technologies have different performance characteristics that are considered when distributing large video content to in-home audiences via the Internet according to one embodiment of the present system. The system captures many properties of the Internet, especially those in the "last mile" where most of the delay and congestion for in-home broadband networks is likely to occur and allows for a configurable number of nodes and hopes. Some of the details on the Internet connectivity model was published in "An Abstract Internet Topology Model for Simulating Peer-to-Peer Content Distribution" by LaFortune, et al. and is incorporated by reference for all purposes.

Certain aspects of the enhanced P2P system have been implemented in a high-performance event-based simulation environment that supports an implementation of the mainline BitTorrent client software coupled with the enhancements of the tracker and initial content seed software (origin seeds).

To ensure confidence in the simulation results, the discrete-event simulator has been validated through at least the following: (1) Detailed analysis of existing open source P2P client and server software implementations; (2) P2P client test beds executing real P2P client software on controlled swarm environments; (3) Analysis of data collected from live BitTorrent P2P swarms; and (4) Published results from other BitTorrent simulation-based research.

Prior to the BitTorrent discrete-event simulator, there had been no viable alternative for studying the dynamics for swarms of more than 1,000 peers. However, results obtained from large-scale discrete event simulations indicate a number of atypical swarm behaviors emerge for larger swarms. Hence, many of the phenomena identified and optimized as detailed herein have not been readily apparent to other parties in the P2P community.

Figure 9:
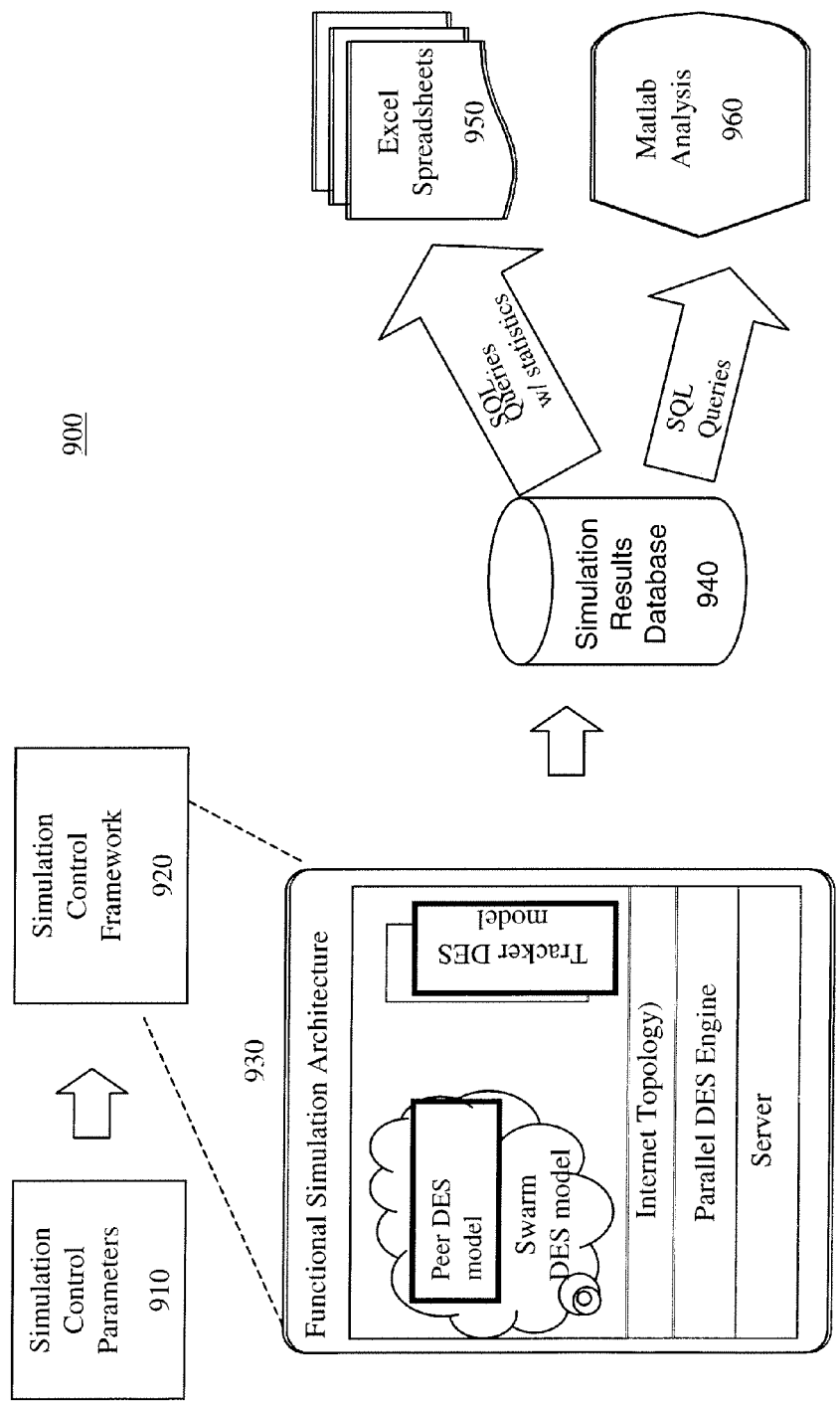
FIG. 9 depicts a simulation system for P2P swarms according to one embodiment.

FIG. 9 illustrates one methodology for studying the dynamics of large-scale BitTorrent-based P2P swarms 900. In this example, a specified range of Simulation Control Parameters 910 is used to define sets of P2P parameters that control individual simulation runs. These parameter sets are used by the Simulation Control Framework 920 to invoke the P2P Functional Simulator 930. The P2P Functional Simulator is a discrete-event based simulator that incorporates functional implementations for mainline and enhanced BitTorrent technologies. These functional discrete-event simulation models accurately implement complete communications and control behaviors of actual BitTorrent system components (i.e., the tracker, origin seed and peer implementations), but abstract the underlying data communications between these system components in order to accelerate the simulation. Data communications are modeled for simulation by the aforementioned Internet Topology model, which provides bandwidth for communications among system components based on a variety of parameters (e.g., hop counts, packet loss, round trip times, etc.). The simulation results for each run were then loaded into a relational database (Simulation Results Database 940) for subsequent analysis in MATLAB 960 and Excel 950.

The simulation environment provides the ability to specify a number of control parameters and collect a variety of simulation results for the given set of control parameters. Examples of the simulation control parameters include: Digital media characteristics (file size: BitTorrent encoding characteristics, e.g., piece count and piece size); Internal P2P Client tuning parameters (BitTorrent tuning characteristics, e.g., connections per peer, tracker interaction throttling, etc.); Swarm characteristics (flash crowd size, steady-state arrival rates, peer departure rates, etc.); P2P deployment architectures (number of origin seeds and their geographic location (e.g., NY, LA, or other top geographic markets), bandwidth provisioning of origin seeders, etc.); Peer selection algorithms including "mainline" (existing BitTorrent peer selection) as well as a variety of candidate "enhanced" peer selection algorithms; Network technology parameters including cable and DSL technology profiles (e.g., upload and download bandwidths), technology adoption rates, network packet loss rates, etc; and Peer locality biases versus statistical topology models (enables evaluation of significance of "peer locality" on P2P swarm performance).

For each simulation run, a variety of information is collected that is useful in assessing the characteristics of that particular simulation run. Examples of the simulation results include:

(1) Content publisher related information including aggregate data transfer requirements for origin seeds and trackers (used for cost estimation), tracker and origin seed loading requirements (useful for capacity planning), and detailed tracker and seeder statistics.

(2) ISP related information includes estimates on core bandwidth and transit bandwidth requirements, and edge bandwidth requirements.

(3) Individual peer statistics includes download completion times and variability, bandwidth usage characteristics, and detailed statistics for each peer.

(4) Aggregate Results including bandwidth statistics on the swarm, amount of data delivered, etc. Furthermore, having access to all information in the simulation allows comparisons of actual "world views" with information that individual system elements have (e.g., tracker knowledge of swarm versus actual status).

(5) Other data collected includes individual peer session data (ramp time, end game mode time, maximum bandwidth required, etc.) and quality-of-service data (useful in studying P2P streaming performance).

Because the P2P technologies being studied are random processes, the simulation runs are repeated (typically ten times) using known random number generator seed values. Using this controlled set of random number seed values ensures repeatability across simulation runs (e.g., the individual peer topology and birth times will be the same) and, for example, allow direct comparison of the relative merits of "mainline" and "enhanced" peer selection algorithms.

The unique capabilities of the BitTorrent based simulation environment provide the tools to study and understand the dynamics of P2P swarm behavior. Furthermore, the environment allows quantitative comparisons of the relative merits of "enhanced" P2P algorithms against each other as well as against the mainline BitTorrent P2P implementation.

In one simulation study, the following P2P usage scenarios were evaluated: flash crowds, steady state swarms, as well as combinations of these. For a flash crowd, peers enter swarm very rapidly at the onset of the swarm. This scenario models content subscription use cases where peers that subscribe to content (e.g., TV shows) are notified that new content is available (e.g., via an RSS feed) and initiate content download after notification. The steady state use cases correspond to random arrival rates typical of users browsing a web site and initiating content download by interactively selecting the content to download. Both of these scenarios use random peer arrivals, but the number of peers and associated arrival rates may be specified for each use case independently. Furthermore, the flash crowd and the steady state use cases may also be combined to model additional expected P2P usage scenarios.

Figure 10:
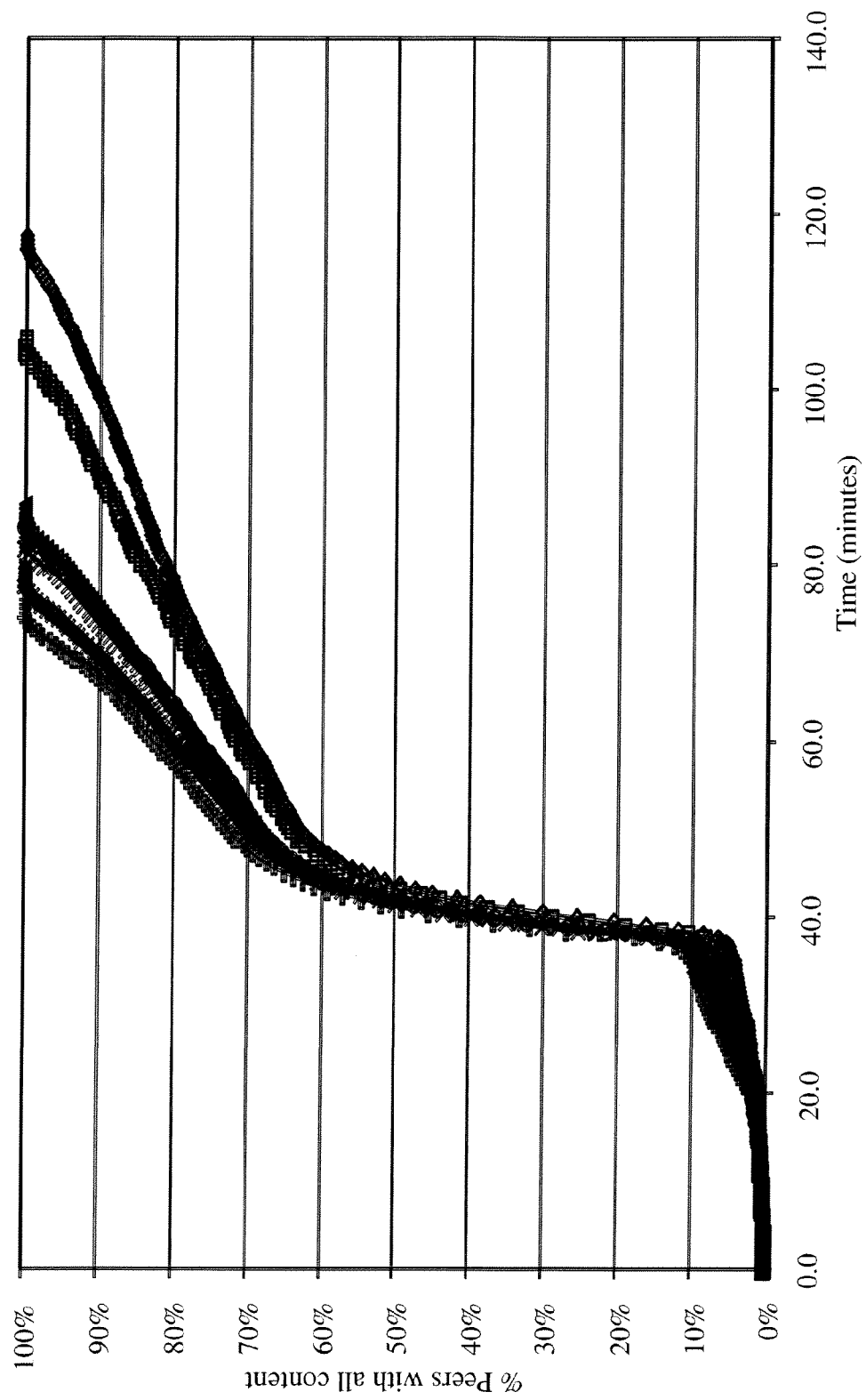
FIG. 10 shows a BitTorrent mainline simulation results for different simulation runs for pure flash crowds.

FIG. 10 shows a BitTorrent mainline simulation results for ten different simulation runs for pure flash crowds of 8,000

(US-based) peers each with a single origin seed located in New York City. The content is a 128 MB file consisting of 512 pieces. As shown in the figure, with all factors being controlled save for random variations from run to run, significant variation in quality of service among peers is shown, with worst case completion times ranging from 75 to 117 minutes. Furthermore, reasonable download scaling is noted for the first 60% of the peers, but the remaining 40% of peers have a significantly lower download completion rate. Such scaling characteristics do not bode well for larger swarm sizes.

Figures 11A, 11B:
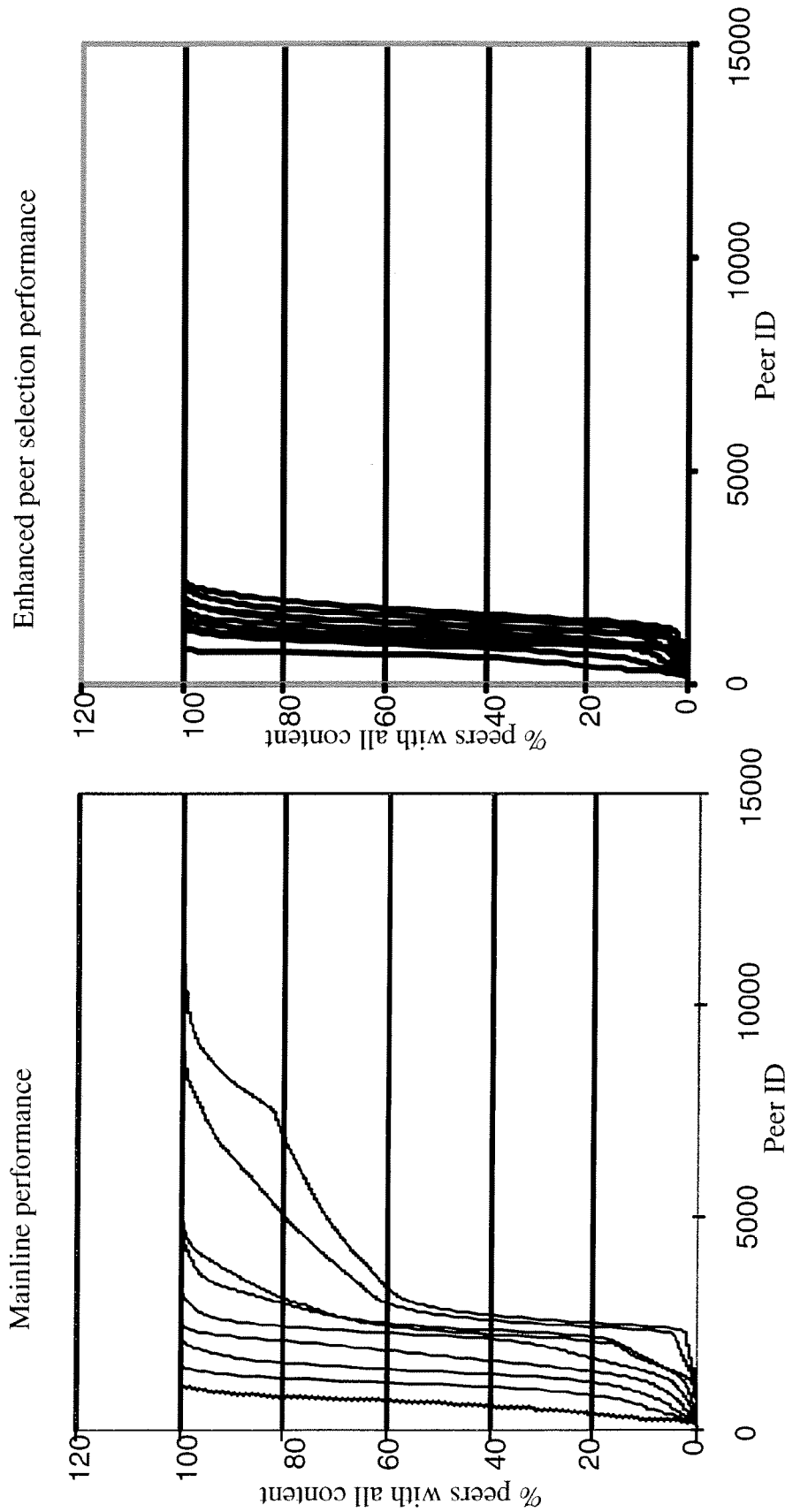
FIG. 11a shows simulated average peer download completion time for a range of pure flash crowd sizes for mainline P2P.
FIG. 11b shows the improvements in the simulated average peer download completion times for flash crowd swarm sizes according to one embodiment.

FIG. 11a shows average peer download time statistics for a range of pure flash crowd sizes ranging from 80 to 64 k peers. Each curve represents the average completion time over ten simulation runs for the given swarm size and the general trend indicates that the quality-of-service degrades with larger flash crowds. However, this is not a strict rule since the average download performance for peers in the 64 k swarm is consistently faster than the 16 k and 32 k swarm sizes. This illustrates some of the complexity in understanding the P2P swarm dynamics.

FIG. 11b shows the improvements in simulated average peer download completion times for flash crowd swarm sizes ranging from 80 to 64K peers with the enhanced processing detailed herein. The data presented in this figure shows significantly faster download times for the enhanced P2P technologies when compared to the equivalent mainline peer download times (shown in FIG. 11a).

Figure 12:
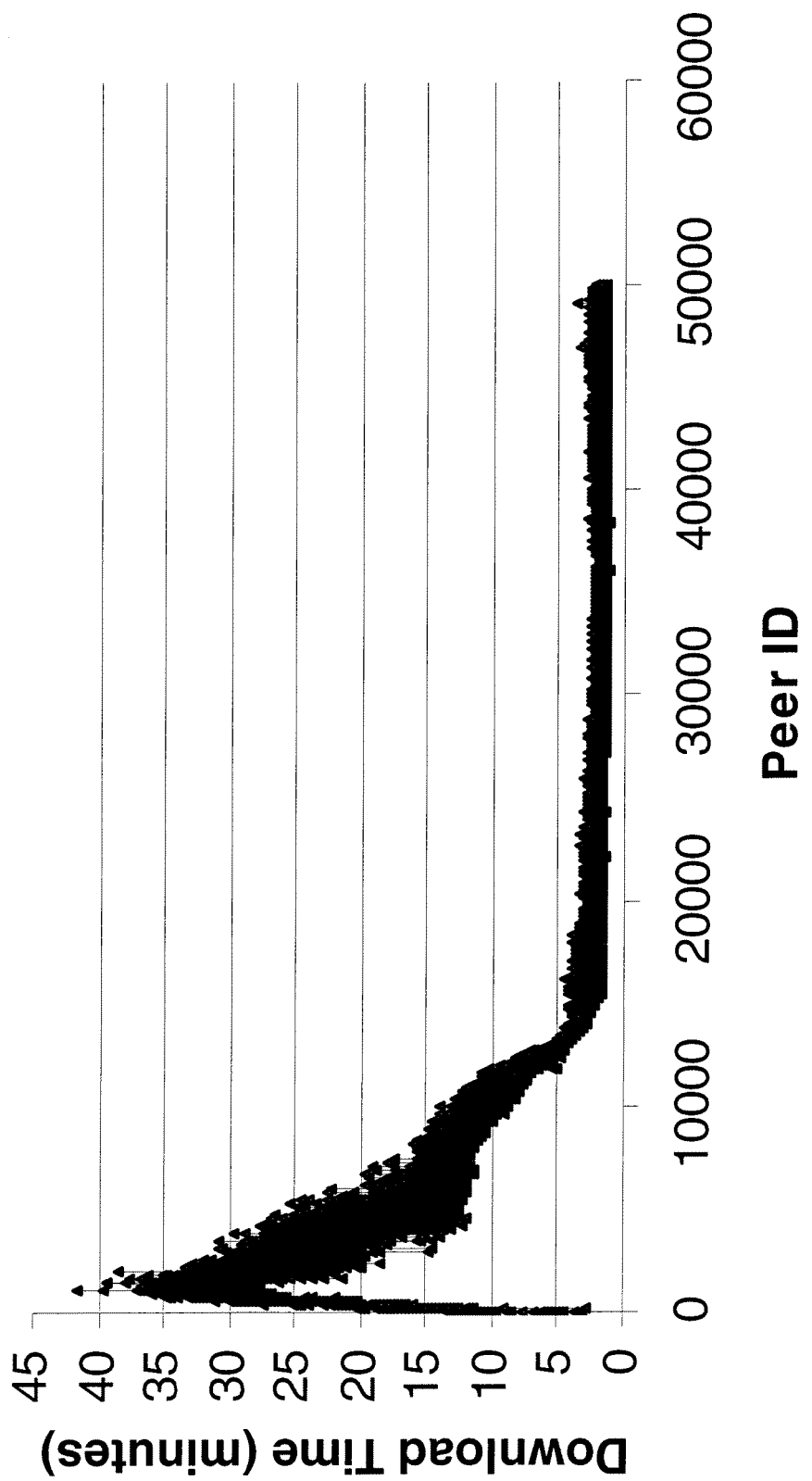
FIG. 12 shows simulation results for peer download completion time versus birth order.

FIG. 12 shows simulation results for peer download completion time versus birth order in a 50,000 peer simulation run with an initial 8,000 peer flash crowd. (Note: In this example, 8,000 peers were "flashed" into the swarm and the remaining 42,000 peers were subsequently "trickled" into the swarm.) What is evident in these results is that the initial swarm start-up for the flash crowd is where most of the quality-of-service issues are experienced. Once the swarm has been running for a while, the download times improve dramatically. Hence, most of the quality-of-service issues are experienced by the initial peers in the flash crowd portion of the swarm life cycle.

Figures 13A, 13B:
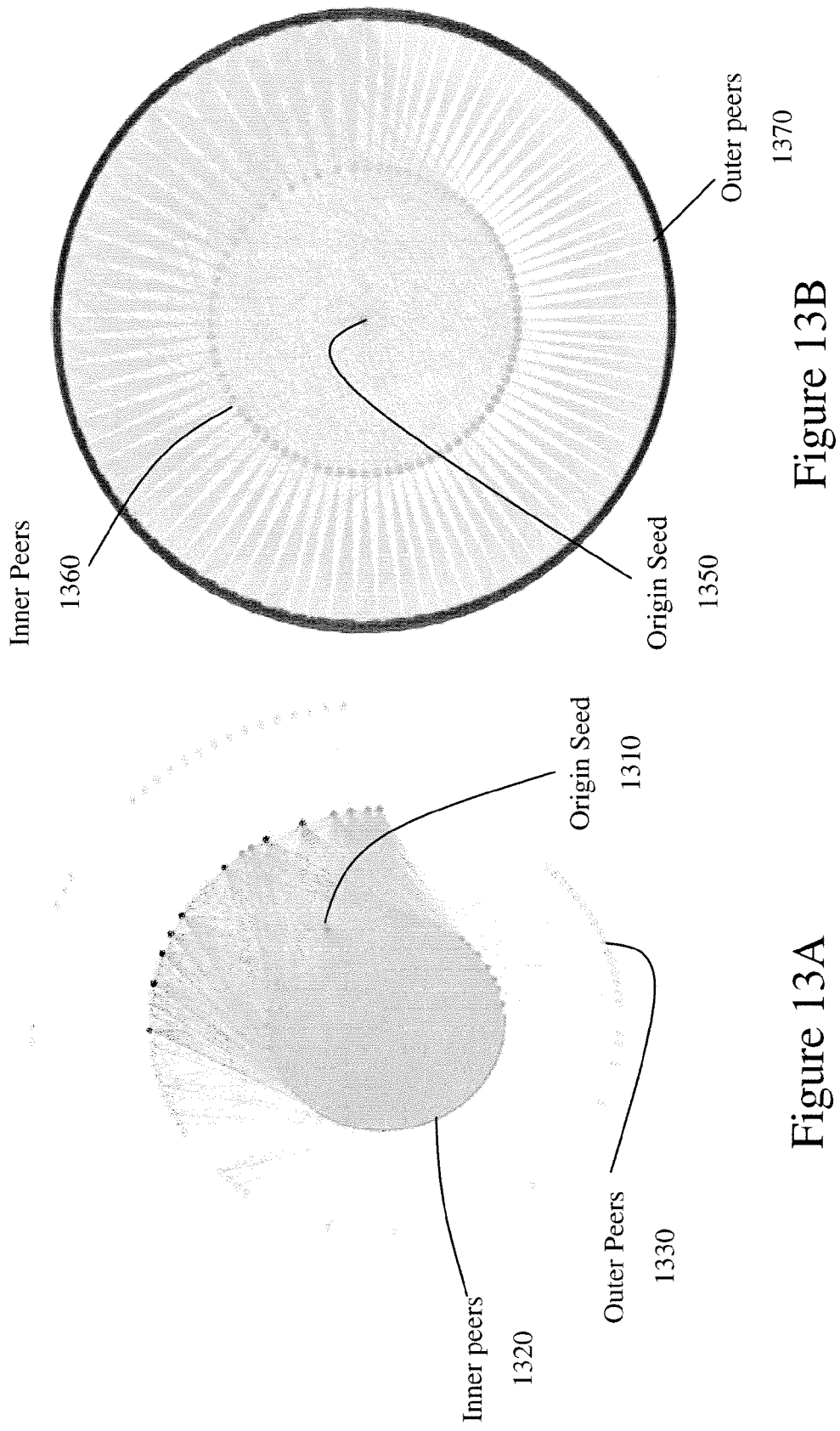
FIG. 13A is a graphical depiction showing the unbalanced nature of the peer connectivity map of the first set of peers after the onset of the simulation of a swarm when using the prior P2P system.
FIG. 13B is a graphical depiction showing the more balanced nature of the peer connectivity map of the first set of peers after the onset of the simulation of a swarm when using the enhanced P2P system.

FIG. 13A depicts the simulated P2P overlay network for all peers within two hops of the origin seed after the onset of a simulation of the flash crowd when using the typical BitTorrent random peer selection system. The origin seed 1310 connects to a completely random set of other peers that in turn each connect to a completely random set of peers. For the most part, the peers in the inner tier 1320 are one hop from the origin seed while the peers in the outer tier 1330 are two hops from the origin seed 1310. In the earliest stages of a swarm's life, the tracker is aware of few peers. So, when it distributes peer-lists, the peers will be highly interconnected. This is fine if the swarm stays small, but if the number of simultaneous peers becomes large, the first peers become too tightly interconnected which to some degree shuts out peers that join the swarm later. In FIG. 13a, this manifests itself as both a high density of interconnections for the inner peers 1320, and a low density of interconnections for the outer peers 1330. The unbalanced distribution equates to quality of service problems and general inefficiency.

FIG. 13B shows the analogous overlay network when simulating an enhanced peer selection system under the identical conditions (same pure flash crowd with one origin seed). Similarly, for the most part, the peers in the inner tier 1360 are one hop from the origin seed while the peers in the outer tier 1370 are two hops from the origin seed 1350. In FIG. 13B, this manifests itself as both a lower density of interconnections among the inner peers 1360 and a substantially larger number of outer peers 1370. The number of connections to the origin seed is unchanged. However, there is now a more regular—but still partially random—nature of the overlay network. Since the enhanced peer selection software has prevented the tight coupling of the first peers into the swarm, there is both a noticeable decrease in the density of interconnections at the center of the diagram (where most peers are one peer-hop from the origin seed) and a significant increase in the number of peers that are two peer-hops from the origin seed. In this more balanced approach, there are fewer bottlenecks in the distribution paths thereby allowing for faster, wider dissemination of the content—especially at the onset of the swarm. Hence, the overall time required for content delivery to the swarm is lower.

Figure 14B:
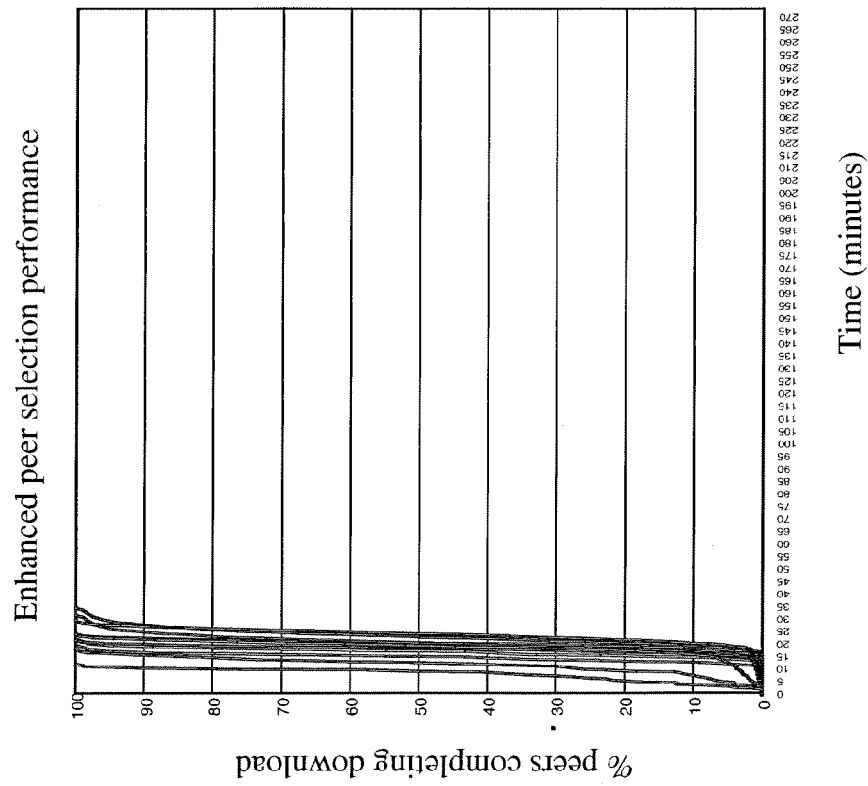
FIG. 14B is a graphical depiction showing how the simulated performance of the enhanced P2P system for various size crowds according to one embodiment.
Figure 14A:
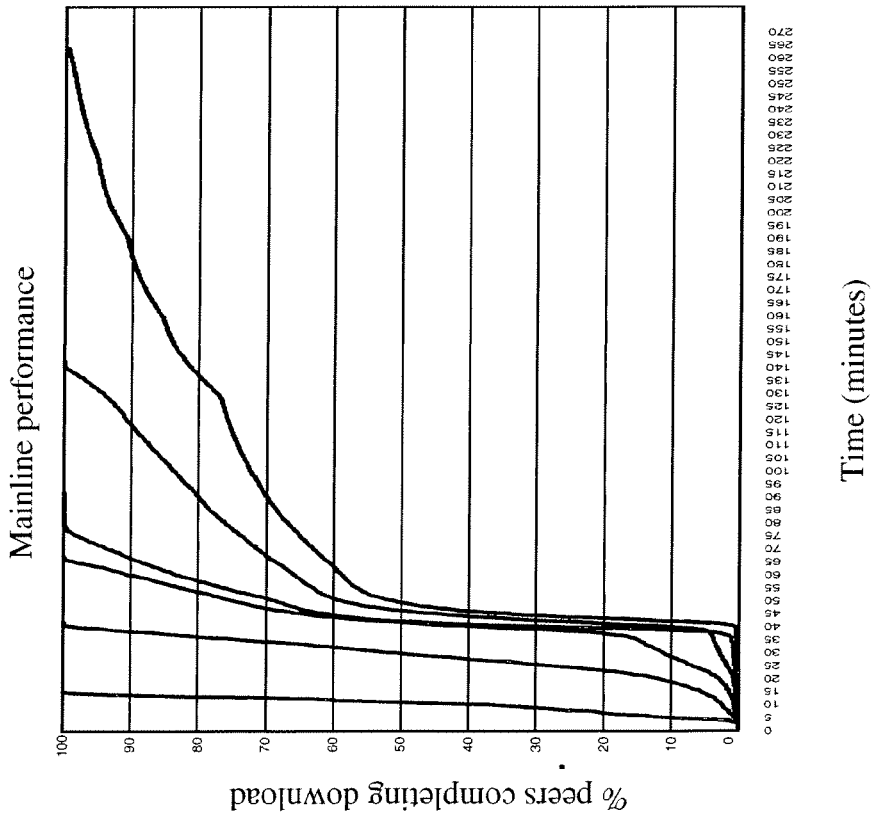
FIG. 14A is a graphical depiction showing the simulated performance of the prior P2P system for various size crowds.

FIG. 14A is the BitTorrent simulated performance graph used for comparison purposes with the simulated enhanced BitTorrent system for the modified peer selection. As noted, FIG. 14A shows the slower performance using the mainline random per selection for downloads as the number of participants in the swarm grows. FIG. 14A illustrates the BitTorrent mainline simulated performance with the random peer selection method for various pure flash crowd sizes ranging from 80-256,000 each with a single origin seed having 512 pieces for a 128 MB file. In general, as the P2P flash crowd increases, the quality of service decreases and the time it takes for the totality of peers in the swarm to obtain complete copies of the content increases. As detailed herein, the decrease in the quality of service relates to the random peer selection implemented by the tracker. In particular, the time for all the peers to acquire all the content is considerably longer for the swarm with 256,000 peers than it is for the smaller swarms.

FIG. 14B illustrates the improved performance using the enhanced peer selection system and accelerated download capability even with substantial increases to the swarm size.

Figures 15A, 15B:
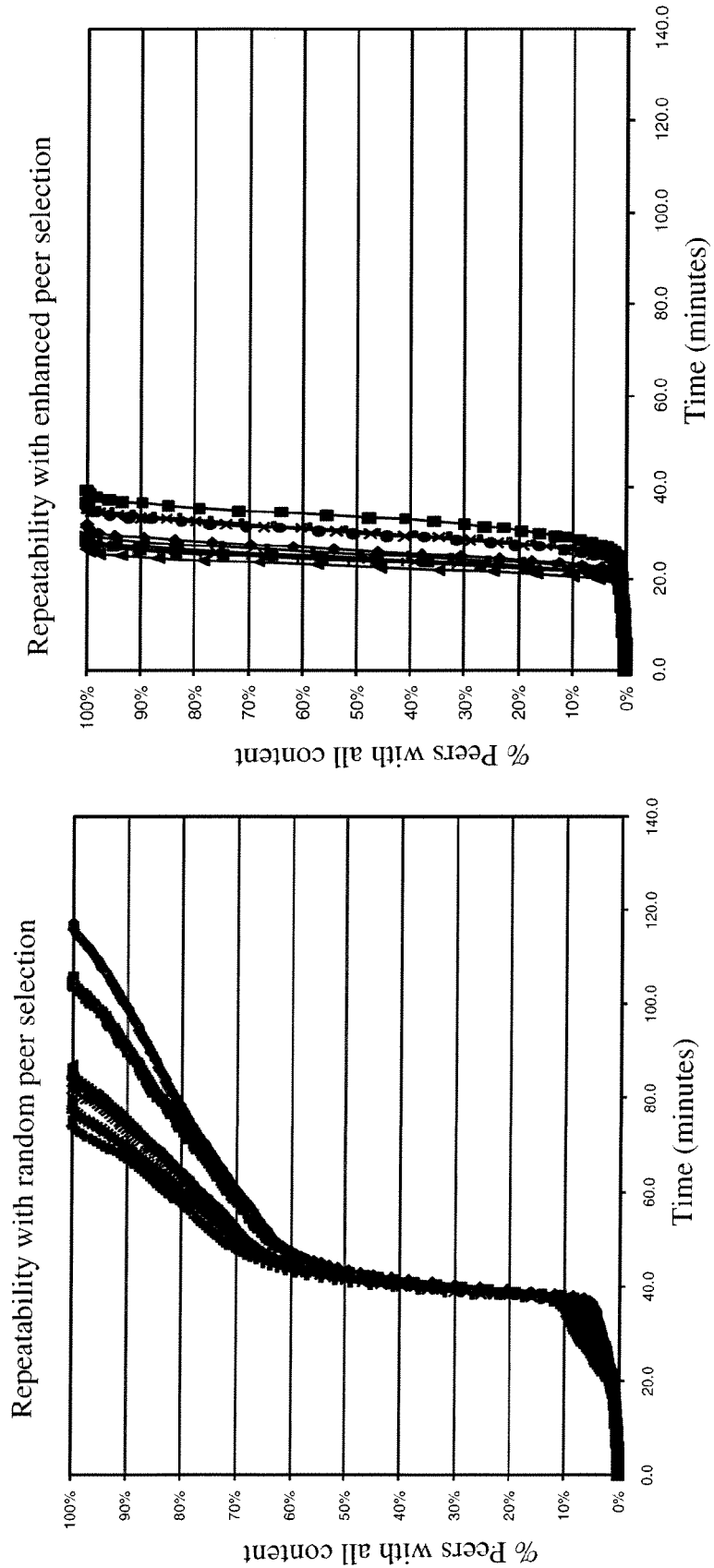
FIG. 15A is a graphical depiction showing the simulated repeatability of the prior P2P system.
FIG. 15B is a graphical depiction showing the simulated repeatability of the enhanced P2P system according to one embodiment.

Referring to FIGS. 15A and 15B, the repeatability aspects for the BitTorrent system with random peer selection shown in FIG. 15A and the enhanced peer selection system of FIG. 15B are presented. The simulated results illustrate that the percentage of peers with all the content takes much longer in the BitTorrent mainline system with random peer selection as compared to the enhanced system with enhanced peer selection and that there is greater consistency with the enhanced version. In this simulated scenario, the total flash crowd had 8,000 peers and 1 seeder for a content file having 128 MB size and subdivided into 512 pieces. The processing was repeated ten times with unique random number generator seeds.

Again referring to FIGS. 15A and 15B, the mainline performance shows an average swarm completion time of approximately 86.8 minutes compared to the 32.8 minutes for the enhanced version. The standard deviation for the completion time indicates that the mainline performance had a 13.8 minutes standard deviation as compared to 4.5 minutes for the enhanced system. The average peer download time was 48.2 minutes for the mainline and 26.6 minutes for the enhanced system. In the enhanced peer selection system, all peers obtained the content in under 40 minutes whereas some peers waited approximately 120 minutes in the mainline system. The standard deviation for the download time for peers in the enhanced simulation was far less than those of the mainline simulation.

Figure 16:
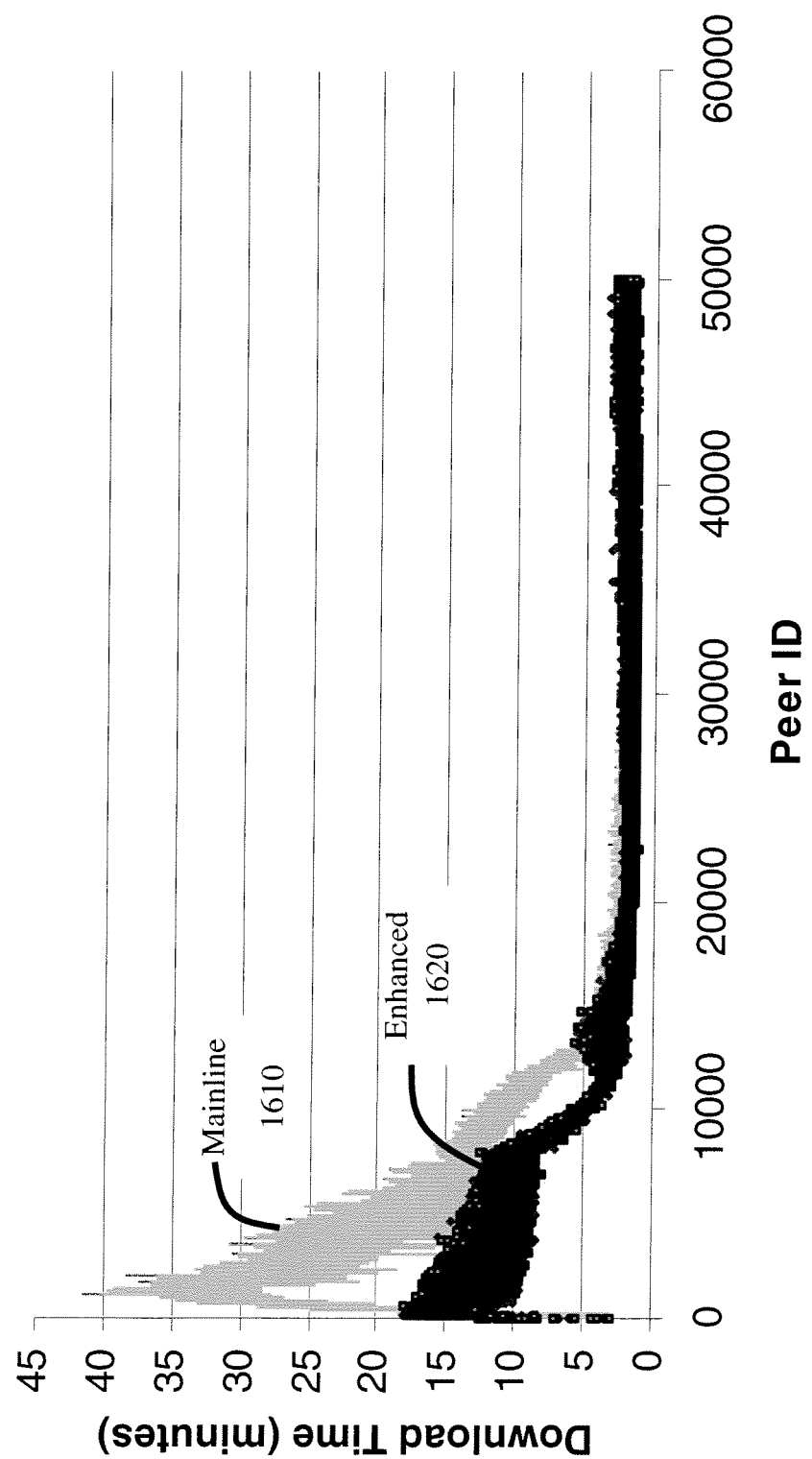
FIG. 16 compares the peer download times for peers in the initial flash crowd for both the enhanced and mainline P2P technologies.

FIG. 16 compares the peer download times for peers in the initial flash crowd for both the enhanced and mainline P2P technologies. Here, the simulation data is again for a 50,000 peer swarm with 8,000 peers in the initial flash crowd, and peers are ordered horizontally by peer birth time. The data in this figure shows that the enhanced technologies offer significant performance advantages for peers in the initial flash crowd, while preserving the steady state performance associated with healthy BitTorrent P2P swarms.

In order to objectively measure P2P quality-of-service characteristics, a set of defects have been defined that can be measured and compared across various peer selection algorithms. Briefly, the defects are as follows:

(1) Swarm Scaling Defects
  a. Peer download completion times are "sub-linear", i.e., a percentage of peers have significantly worse completion times than the bulk of the swarm.
  b. Swarm completion time exceeds a specified time limit.
(2) Download Time Defects
  a. Download completion times are slower than mainline BitTorrent.
  b. Peer download time exceeds a specified time limit.

Figure 17:
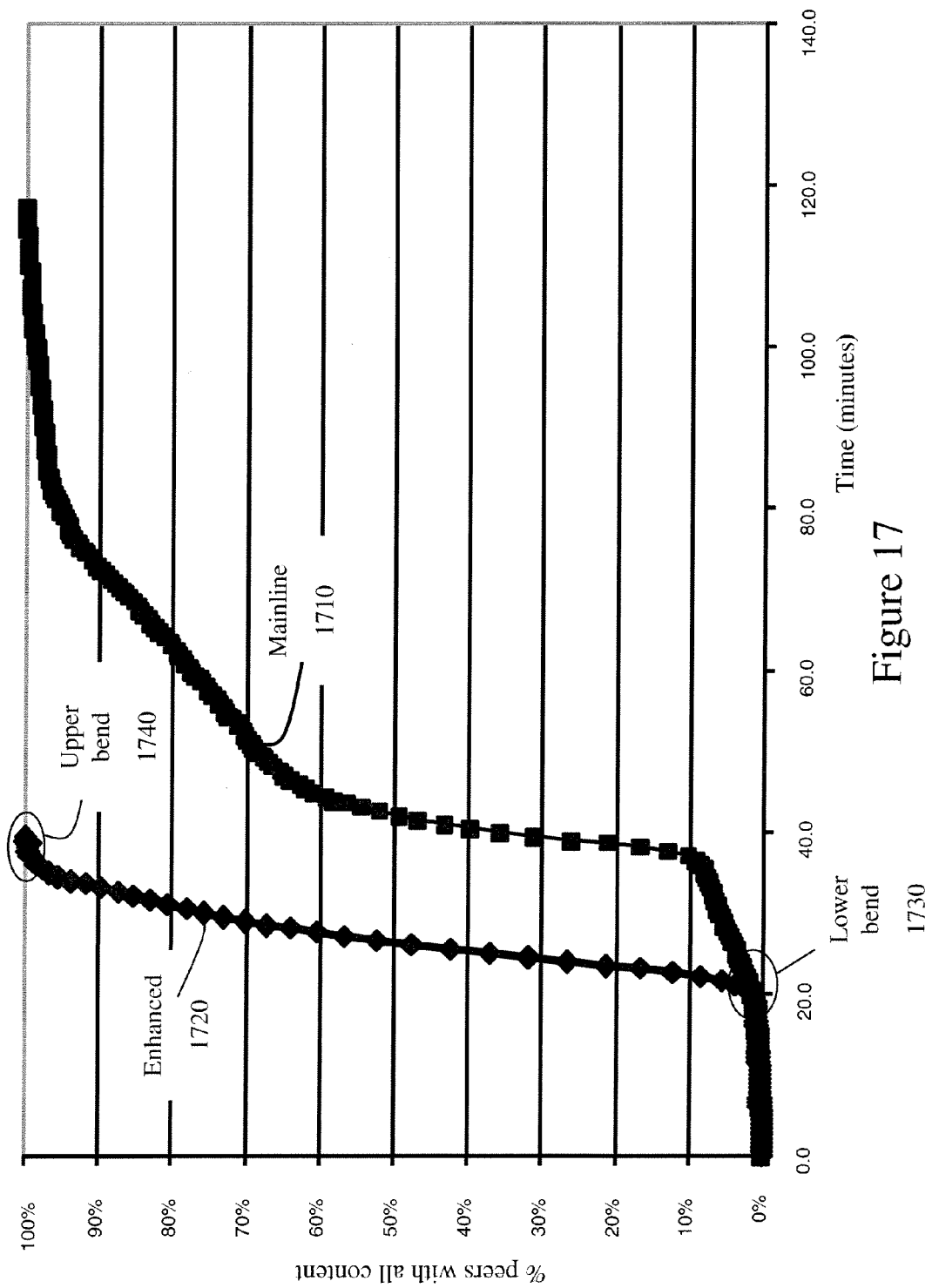
FIG. 17 provides an example of defect measurements comparing the enhanced algorithms against the mainline BitTorrent implementation.

FIG. 17 shows an example of defect measurements on the 8,000 peer repeatability study comparing the enhanced algorithms against the mainline BitTorrent implementation. Specifically, at the start-up of the swarm, a small number of download completion defects where mainline 1710 peers (fourteen out of 8,000 peers) successfully completed their download faster than the corresponding enhanced peer selection software 1720 (see lower bend 1730). However, as the numbers indicate this advantage is temporary and negligible. Similarly, approximately 1% of the peers in the enhanced peer selection software suffer from scaling defects (upper bend 1740) compared with approximately 38% of peers in mainline 1710. Finally, the download time defects depend on how much time is permitted for a download to be considered successful. Given forty minutes to complete the download, 64% of the mainline peers exceed the forty-minute time window compared to no defects for the enhanced peers.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for acceleration of peer-to-peer download of a content file in a swarm, the system comprising:
   an origin seed at least initially a peer of the system, the origin seed storing the content file;
   a tracker maintaining a list of peers in the swarm;
   a requesting peer participating in the swarm;
   an enhanced message scheme for communicating between at least the tracker and the origin seed; and
   wherein the tracker selects and uses at least one dynamically adjusting peer selection algorithm, from a plurality of peer selection algorithms, to select at least one peer from the list of peers, the selection of the at least one dynamically adjusting peer selection algorithm being based on at least one of a swarm condition and a requesting peer condition, wherein the selection of the at least one peer is used to generate a condition based peer-list, and provides the condition based peer-list to the requesting peer.

2. The system according to claim 1, wherein the tracker optionally provides peer information about the requesting peer to the origin seed using the enhanced messages.

3. The system according to claim 1, wherein the origin seed is the requesting peer and the tracker provides the condition based peer-list to the origin seed.

4. The system according to claim 1, wherein the content file is comprised of a plurality of pieces and the origin seed distributes the pieces to the peers in the swarm, and wherein the origin seed is removed from the system after all of the pieces for the content file are distributed.

5. The system according to claim 1, wherein the swarm condition is selected from the group consisting of: number of non-seeds in the swarm, number of non-origin seeds in the swarm, number of origin seeds in the swarm, rate of change of number of non-seeds in the swarm, rate of change of number of non-origin seeds in the swarm, rate of change of number of origin seeds in the swarm, historical patterns of prior usage, and combinations thereof.

6. The system according to claim 1, wherein the requesting peer condition is selected from the group consisting of: type of the peer requesting the peer-list, age of the peer, amount of content lacking by the peer, amount of content received by the peer, amount of content transmitted by the peer, network locality of the peer, geographic locality of the peer, percent of content lacking by the peer, total number of times the peer has requested the peer-list, the elapsed time since last request by the peer for the peer-list, upload rate of the peer, download rate of the peer, adjusting the peer selection based on a device type, and combinations thereof.

7. The system according to claim 1 wherein the swarm is part of a structured overlay network.

8. The system according to claim 1 further comprising an origin scout participating in the swarm and providing at least one of swarm information and peer information to the tracker using an enhanced message scheme.

9. The system according to claim 1, wherein the tracker is a centralized tracker server for handling at least one swarm.

10. The system according to claim 1, wherein the condition based peer-list is operational with legacy peer-to-peer systems.

11. The system according to claim 1, further comprising a client information storage maintaining at least one of peer IP addresses and ports, geographic location, and network locality, and security credentials.

12. A method for producing a selective peer-list for a swarm, comprising:
   processing a peer-list for a plurality of peers in the swarm;
   receiving a peer-list request from a requesting peer;
   determining a condition of the swarm and a condition of the requesting peer;
   communicating between a tracker and an origin seed via an enhanced message scheme;
   dynamically selecting a peer selection algorithm from a plurality of peer selection algorithms based on the condition of the swarm, the condition of the requesting peer, or both;
   selecting at least one peer from the peer-list via the peer selection algorithm;
   generating the selective peer-list from the selected peers; and
   communicating the selective peer-list to the requesting peer.

13. The method according to claim 12, further comprising communicating peer information about the requesting peer to the origin seed using the enhanced message scheme.

14. The method according to claim 12, further comprising generating an origin seed peer-list and communicating the origin seed peer-list to the origin seed.

15. The method according to claim 12, further comprising using the enhanced messages for controlling origin seed functions, wherein the origin seed functions are selected from at least one of the group consisting of: sizing of origin seed upload bandwidth, sizing of origin seed tracker re-request interval, limiting connection time between origin seeds and peers, refusing connections from other peers, and cycling through content during upload.

16. The method according to claim 12, wherein the generating of the selective peer-list is based on at least one of the condition of the swarm and the condition of the requesting peer.

17. The method according to claim 12, wherein the generating of the selective peer-list is based on at least one of the group consisting of: biasing the peer selection toward younger peers, biasing the peer selection toward older peers, omitting at least some origin seeds from the peer-list generated for a peer, omitting at least some seeds from the peer-list generated for a seed, biasing the peer selection for the peer-list based on network locality, biasing the peer selection for the peer-list based on geographic locality, and generating an artificial non-empty peer-list for any non-origin seed when a ratio of seeds to peers in the swarm exceeds a programmable threshold, and adjusting the peer selection based on a device type.

18. A non-transitory computer readable medium comprising computer executable instructions adapted to perform the method of claim 12.

19. The method according to claim 12, further comprising at least one of encrypting of content files, encrypting peer communications, authenticating peer software, and authenticating a client.

20. The method according to claim 12, wherein the configuring the peer selection algorithm includes at least one of setting at least one programmable parameter and selecting a peer selection algorithm.

21. A system for acceleration of content file downloads in swarms, the system comprising:
a plurality of non-origin peers and initially an enhanced origin seed in an overlay network of peers;
an enhanced distributed tracker peer for generating selective peer-lists, the enhanced distributed tracker peer selecting at least one peer from a group of peers in the swarm via a dynamically adjustable peer selection algorithm selected from a plurality of peer selection algorithms based on at least one of a condition of the non-origin peers and a condition of the swarms; generating the selective peer-lists based upon the selected peers; and an enhanced message scheme for communicating between at least the distributed tracker peer and the origin seed.

22. A tangible, non-transitory, machine readable medium, the machine-readable medium, comprising:
processor instructions for an enhanced tracker for facilitating downloading of content among a plurality of peers participating in a swarm, comprising:
processor instructions for obtaining a list of the peers;
processor instructions for selecting at least one peer from the list of peers based upon at least one of a condition of the swarm and a condition of the requesting peer using a dynamically adjusting peer selection algorithm selected from a plurality of peer selection algorithms based upon the at least one of the condition of the swarm and the condition of the requesting peer;
processor instructions for generating a condition based peer-list for a requesting peer based upon the selected peers;
processor instructions for transmitting the selective peer-list to the requesting peer; and
processor instructions for for communicating between at least the enhanced tracker and the origin seed via an enhanced message communication scheme.

23. The machine readable medium according to claim 22, wherein the tracker includes a software module having programmable parameters and a dynamically configurable peer selection algorithm.

24. The machine readable medium according to claim 22, wherein the processor instructions for processing said selective peer-list is based on at least one of the group consisting of: biasing the peer selection toward younger peers, biasing the peer selection toward older peers, omitting at least some origin seeds from the peer-list generated for a peer, omitting at least some seeds from the peer-list generated for a seed, biasing the peer selection for the peer-list based on network locality, biasing the peer selection for the peer-list based on geographic locality, generating an artificial non-empty peer-list for any non-origin seed when a ratio of seeds to peers in the swarm exceeds a programmable threshold, and adjusting the peer selection based on a device type.

* * * * *